US008521817B2

(12) United States Patent
Ryan et al.

(10) Patent No.: US 8,521,817 B2
(45) Date of Patent: *Aug. 27, 2013

(54) SOCIAL NETWORK SYSTEM AND METHOD OF OPERATION

(75) Inventors: Grant James Ryan, Christchurch (NZ); Gary Lee Franklin, Christchurch (NZ); Julian Malcolm Cone, Christchurch (NZ); William Ferguson Stalker, Christchurch (NZ); Derick Ian Robinson, Christchurch (NZ)

(73) Assignee: Intel Corporation, Santa Clara, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/009,822

(22) Filed: Jan. 19, 2011

(65) Prior Publication Data
US 2011/0112976 A1    May 12, 2011

Related U.S. Application Data

(63) Continuation of application No. 10/812,789, filed on Mar. 29, 2004, now Pat. No. 7,904,511.

(30) Foreign Application Priority Data

Sep. 30, 2001 (NZ) .......................................... 514368
Apr. 29, 2002 (NZ) .......................................... 518624
Sep. 30, 2002 (WO) ...................... PCT/NZ02/00199

(51) Int. Cl.
*G06F 15/16* (2006.01)

(52) U.S. Cl.
USPC ........... 709/204; 709/205; 709/217; 709/225; 709/227; 705/319

(58) Field of Classification Search
USPC ......... 709/230, 203–207, 217–219, 223–228; 707/10; 705/319
See application file for complete search history.

(56) References Cited

U.S. PATENT DOCUMENTS 6,061,681 A     5/2000  Collins
6,269,369 B1 *  7/2001  Robertson ...................... 707/10
(Continued)

FOREIGN PATENT DOCUMENTS

EP    1 209599 A2   5/2002
EP    1 221665 A1   7/2002
(Continued)

*Primary Examiner* — Bharat N Barot
(74) *Attorney, Agent, or Firm* — Blakely, Sokoloff, Taylor & Zafman LLP

(57) ABSTRACT

A method of forming unique, private, personal, virtual social networks on a social network system that includes a database storing data relating to corresponding user entities. The method includes: a first user entity sending an invitation to a second user entity, recording in the database the second user entity as a direct contact of the first user entity and determining that third user entities, directly connected to the second user entity, are indirect contacts. A unique, personal, social network formed from direct and indirect contacts is thereby created for each user entity. Each user entity is able to control privacy of its data with respect to other user entities depending on the connection factor to that other entity and/or that other entity's attributes. Each user entity is able to take the role of provider or participant in applications where the provider provides an item or service to the participant.

26 Claims, 12 Drawing Sheets

(56) References Cited

U.S. PATENT DOCUMENTS

| | | | |
|---|---|---|---|
| 6,327,572 B1 | 12/2001 | Morton et al. | 705/10 |
| 6,339,595 B1 | 1/2002 | Rekhter et al. | 370/392 |
| 6,408,309 B1 | 6/2002 | Agarwal | |
| 6,430,602 B1 | 8/2002 | Kay et al. | 709/206 |
| 6,463,061 B1 | 10/2002 | Rekhter et al. | 370/392 |
| 6,526,056 B1 | 2/2003 | Rekhter et al. | 370/392 |
| 6,539,421 B1 | 3/2003 | Appelman et al. | 709/206 |
| 6,651,086 B1 | 11/2003 | Manber et al. | 709/205 |
| 6,681,108 B1 * | 1/2004 | Terry et al. | 455/412.2 |
| 6,742,032 B1 | 5/2004 | Castellani et al. | 709/224 |
| 6,757,712 B1 | 6/2004 | Bastian et al. | 709/206 |
| 7,069,308 B2 | 6/2006 | Abrams | 709/218 |
| 7,085,806 B1 | 8/2006 | Shapira | 709/203 |
| 7,092,821 B2 | 8/2006 | Mizrahi et al. | 702/1 |
| 7,117,254 B2 | 10/2006 | Lunt et al. | 709/218 |
| 7,188,153 B2 | 3/2007 | Lunt et al. | 709/218 |
| 7,188,180 B2 | 3/2007 | Larson et al. | 709/227 |
| 7,203,674 B2 | 4/2007 | Cohen | 707/3 |
| 7,209,479 B2 | 4/2007 | Larson | 370/389 |
| 7,269,590 B2 | 9/2007 | Hull et al. | 707/10 |
| 7,280,975 B1 | 10/2007 | Donner | 705/10 |
| 7,363,243 B2 * | 4/2008 | Arnett et al. | 705/7.31 |
| 7,366,759 B2 | 4/2008 | Trevithick et al. | 709/206 |
| 7,428,505 B1 | 9/2008 | Levy et al. | 705/37 |
| 7,454,464 B2 | 11/2008 | Puthenkulam et al. | 709/204 |
| 7,467,212 B2 | 12/2008 | Adams et al. | 709/229 |
| 7,606,860 B2 * | 10/2009 | Puthenkulam et al. | 709/204 |
| 2002/0069080 A1 | 6/2002 | Roy et al. | |
| 2002/0111843 A1 | 8/2002 | Wellenstein | |
| 2002/0161611 A1 | 10/2002 | Price et al. | |

FOREIGN PATENT DOCUMENTS

| | | |
|---|---|---|
| WO | WO 01/52161 A2 | 7/2001 |
| WO | WO 02/17132 A2 | 2/2002 |
| WO | WO 02/25554 A1 | 3/2002 |

* cited by examiner

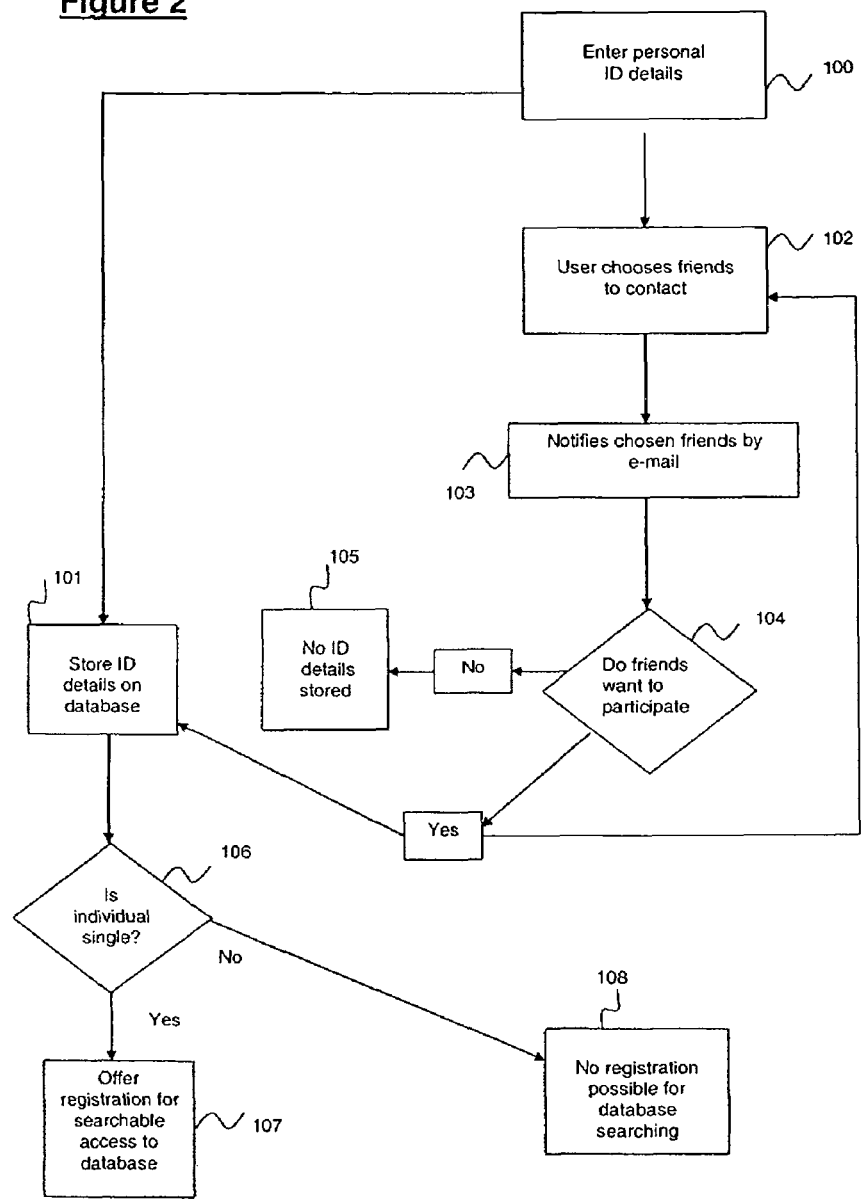

Figure 3

| Help Your Friends | |
|---|---|
| Your Details | |
| First Name | Your email address |
| | |

To help your friends all you have to do is enter in the email addresses of your friends below and the following email will be sent to them. You can modify the letter with the drop down menus to make it more appropriate for you and your friends.

| Subject | *Your Name* - requesting a little help from my friends for my friends |
|---|---|

Hi *Friend's Name*.

This is [a cool ▼] way that you can help your single friends meet other single people in our network of friends. All you have to do click on the link below and follow the easy instructions. You can help your friends (and me) without having to register yourself and no information is ever made available to the general public. The whole process only takes about five minutes.

Click to help your friends

Thanks for helping out.

[Regards ▼]

16

15

14

Sign the letter

List of people to send it to

| First Name | Email address |
|---|---|
| | |
| | |
| | |
| | |
| | |
| | |

17

Send Emails

Notes
- We will only send this one email to your friends. If they do not click on the link and choose to participate we will delete their email address from our records.
- The reason we send this email via a form on a webpage is so that if another common friend has already given us their name we do not need to send them another email hence it reduces email clutter.

Figure 4

Start Using the Service

Using this service is a simple four step process

1. Register for the service
2. Add additional information about yourself to your profile (optional)
3. Invite your friends to join your network (optional)
4. Search your network of friends

Registering for this service

To use this service all you have to do is register by filling out the simple form below (if you have been referred by an email from a friend then most of this form should already be filled out for you). When you have done this you will able to search your network of friends for single people and single people in your network will be able to find you.

Click here for an example of the information you will be able to search through when you register
If you want to use this service to find single people in your network of friends then simply follow this easy registration process

| Who would you like to be able to see the information you provide here?  ☐ Friends of Friends  ☐ Friends of friends of friends | None of the information you enter will be made available to people other than those that you specify here. It will never made available to the general public |
|---|---|
| I am a [Woman / Man] interested in meeting a | [Woman / Man] |
| My Firstname is: | |
| My Lastname is: | [Optional] |
| My preferred email address is: | |
| please confirm your email address: | |
| | Register | jane[jane@janedoe.com] Status: Active

Friends: 1 Friends of Friends: 6 My Entire Network: 14 — 22

Search My Network for Jobs

Full Search Mode

Which is in Your:: ☐ Friends of Friends or ☐ Friends of Friends of Friends

Country: ☐ in New-Zealand or ☐ Any Country (region setting will be ignored)

Region: [Canterbury ▼] Location: [Christchurch]

Job Category: [Arts, Entertainment, and Media ▼]

— 27

[Monthly Chk ▼]  [Load Search]
                 [Save Search]

— 29

— 28

RESULTS

1 Job Found

Page 1 of 1

Job 1 — 31

GRAPHIC DESIGNER

Permanent, Full time (30hrs+)
Graphic Designers & Co.
Julian, a friend of friend of John
05 Mar 02

— 30

1 Job Found

Page 1 of 1

Manage Account | My Options | Manage Network | Generate Invite | Search Jobs | Manage Searches/Alerts | Manage Jobs | How It Works | About Us | LogOut Pricing | Privacy Policy | Contact Us | Terms and Conditions

```
                                                                    22
 jane[jane@janedoe.com] Status: Active               ⎴
                                         Friends: 1  Friends of Friends: 6  My Entire Network: 14

Details for Position: Graphic Designer

Job Title:
 Graphic Designer   [Applications Close: 05 Mar 02]

Company:
 Graphic Designers & Co. ──── 34

Direct enquiries to:
 julian@ISP.com

Job Location:                          ⎫
 Christchurch, Canterbury, New-Zealand   |

The Categories the Job is applicable to:|
 • Arts, Entertainment, and Media        |
 • Internet/E-Commerce                   |

The Type and Hours of the Position are: ⎬  33
 Permanent , Full time (30hrs+)          |

Remuneration Details (if provided):     |
 (NZD)$20 - $40. Hourly Pay              |

Job Description:                        |

5-7 years relevant experience desirable.⎭

Job Posted by: Julian. How Julian is connected to you:  ⎫
 • Your friend John (john@ISP.com) knows Henry who knows Julian ⎬ 35
 • Your friend John (John@ISP.com) knows Fred who knows Julian  ⎭

[ Enquire about this Job ]──── 36
```

32 (label pointing to the window)

Close Window

Manage Account | My Options | Manage Network | Generate Invite | Search Jobs | Manage Searches/Alerts | Manage Jobs |
How It Works | About Us | LogOut Pricing | Privacy Policy | Contact Us | Terms and Conditions

Figure 7

Jane[jane@janedoe.com] Status: Active

Friends: 1 Friends of Friends: 6 My Entire Network: 14

Update Your Profile

22

Your profile is listed below. The first section includes your Required Fields and the second section contains your Optional Fields.

Required Fields
This information is the minimum required by the system

Who would you like to be able to see your details when they search their Network of Friends?

☐ Friends of Friends

☐ Friends of friends of friends

My First name is:
| Jane |

My Last name is:
| [Optional] |

My preferred email address is:
jane@janedoe.com  [Change Your Email Address]

Optional Fields
You only need to fill in the fields you feel comfortable with. You can change this info at any time The Country I live in is:
New-Zealand  [Change your Country]

The Region I live in is:
| Canterbury | ▼ | [recommended]

The City/Town that I live in/near is:
| Christchurch |
[recommended]

37

38

The Categories of Job I am interested in are: [required]
| Accounting/Auditing |
| Administrative and Support Services |
| Advertising/Marketing/Public Relations |
| Agriculture, Forestry, & Fishing |
| Architectural Services |
| Arts, Entertainment, and Media |
| Banking |
| Biotechnology and Pharmaceutical |
| Community, Social Services, and Nonprofit |
| Computers, Hardware |

Manage Account | My Options | Manage Network | Generate Invite | Search Jobs | Manage Searches/Alerts | Manage Jobs |
How It Works | About Us | LogOut
Pricing | Privacy Policy | Contact Us | Terms and Conditions

SOCIAL NETWORK SYSTEM AND METHOD OF OPERATION

CROSS-REFERENCE TO RELATED APPLICATIONS

The present patent application is a continuation of prior U.S. patent application Ser. No. 10/812,789 filed on Mar. 29, 2004, which claims priority from PCT Patent Application No. PCT/NZ/02/00199 filed on Sep. 30, 2002, which claims priority from New Zealand Patent Application No. 514368 filed on Sep. 30, 2001 and New Zealand Patent Application No. 518624 filed on Apr. 29, 2002, all of which are incorporated herein by reference in their entirety.

TECHNICAL FIELD

The present invention relates generally to a database of records compiled from entities with mutual common links and personal and business services based upon these records.

BACKGROUND ART

The interconnectivity of individuals and organisations has increased exponentially in recent times with advent of various telecommunication means, including the Internet.

The Internet has connected the world with literally billions of connected nodes (or users) representing entities of various types,—people, organisations, computers, and other devices. Many solutions such as the world wide web, online bulletin boards, email, online instant messaging, and peer-to-peer solutions allow direct contact between any number of these nodes. The very success of this inter-node connectivity/accessibility has however lead to further problems where a node/entity would prefer to control its 'visibility' and accessibility to a subset of the potential world-wide internet community, for any number of reasons, e.g. discretion, trust, association, preference, improving the quality and relevance of information and so forth.

Existing means of addressing this problem include specific implementation web-sites configurations. These typically require secure access using authentication, with an associated increase in costs, maintenance, administration and lack of flexibility. Specific emails and/or direct telephone contact is often employed, though these require time and effort to implement.

Virtual Private Networks, or Intranets provide companies with secure networks on which only their employees and/or clients and partners can utilise, though again, at a high cost.

There is therefore a need for a system where nodes/entities can still interact with a wide range of implementations and other nodes/entities via any appropriate communication methods, whilst providing control over the distribution of information flow between the nodes and also the degree of 'visibility' of the node/entity, i.e. the degree to which information flow and/or the interconnection between nodes in a user's unique private personal network is discernable to other nodes.

Incentives to restrict the distribution and flow of information within a network include obtaining some form of filtering of irrelevant, useless, unwanted, offensive, intrusive or in any way undesirable information or interaction with other nodes/entities. Humans consciously and subconsciously already utilise such filtering in their daily life by placing greater weighting on information from friends and acquaintances than from unfamiliar sources.

Throughout virtually every aspect of human life, economic, social, personal and business decisions are either directly or indirectly affected by the preferences, tastes and actions of our friends, colleagues and acquaintances. This is in contrast to widely accepted economic theory in the fields of, for example, consumer purchases where it is assumed individuals make rational choices based upon the available product or service information. In actual fact, a recommendation, or an adverse comment from a close trusted acquaintance regarding a specific product will often override other factors in a commercial purchase decision, rightly or not. There are many other areas in which the opinions of respected acquaintances or even organisations can affect the decision making of individuals or organisations.

Examples of just a few embodiments or activities in which trusted or respected contacts or recommendations play a significant role include seeking employment and filling job vacancies, investment opportunities, academic co-operation, finding accommodation or people to share accommodation with, buying and selling goods and services, arranging social/sporting functions, finding friendship, romantic and/or social relationships and so forth.

There are thus numerous possible embodiments that could benefit from a discriminating means of forming a network of contacts with entities of known value to the user.

Considering the example of employment, the task of finding a suitable employee amongst a potentially huge number of applicants obtained through public advertising can be a significant deterrent to many employers. Consequently, many vacancies are only advertised internally or simply filled by recommendations from existing employees. However, such a system is, by its very nature, haphazard and dependant on a non-systematic information distribution system. Conversely, an ideal candidate seeking employment who wants to be aware of a suitable vacancy known to one of his friends would have to systematically inquire with his friends on a regular basis. In practice, this type of behaviour would alienate many friends and thus is not typical. In addition, the candidate would not be aware of vacancies know to friends of his friends unless he could convince his friends to systematically enquire with their friends, which they are unlikely to do.

Nevertheless, employers are still confronted by numerous deficiencies in the existing alternatives to finding an employee. As discussed above, advertising via traditional media outlets such as the newspapers, magazines and so forth can produce an excessive number of applicants. The filtering required to shortlist candidates for interview may be based on misleading impressions formed from Curriculum Vitas, formal qualifications, age, experience and so forth. Furthermore, the cost of the advertising itself together with the processing cost of all the low quality enquires can be a significant burden.

Recruitment agencies may be employed to locate and prefilter potential candidates for higher calibre applicants, though this places a further overhead on the employment process.

Internet employment advertising on online job-boards with open access for all potential candidates can expose the vacancy to a large number of potential candidates. However, this can also lead to numerous inappropriate responses from a variety of sources. Furthermore, the aforementioned disadvantages of newspaper magazine advertising are also present with this method.

There is thus a need to harness the discriminatory powers of the knowledge, opinions and recommendations of an individual's extended social network in an efficient and systematic manner without irritating or alienating members of the network.

As a further example, the process of finding a personal friend or romantic partner is strongly affected by social connections. The desire to establish fulfilling relationships with other humans, whether romantic or otherwise is one of the strongest human drives and can be the cause of a great deal of anxiety, stress and uncertainty. The very process of establishing relationships with other humans is often fraught with difficulties, compounded by the inherent characteristics of most humans to avoid risk and/or potential rejection.

Many relationships and marriages have traditionally been arranged by families and/or stem from relationships established during school, work, or other situations where humans experience a common bond. Traditional demographics and cultural characteristics which historically have provided structures and opportunities for like minded individuals to meet are increasingly being replaced or are considered undesirable and/or unacceptable to a large portion of society.

The increasing urbanisation of populations has resulted with people having lifestyles and schedules which preclude them from establishing successful relationships. Consequently, many people have turned to less traditional means of finding potential mates and a variety of dating services have been provided to meet such needs.

However, many of the factors which inhibit or pose difficulties for individuals to establish relationships with strangers are equally applicable to many such dating services. Even when two people would both like to initiate the first steps in a relationship, shyness, fear of rejection, or other social pressures or constraints often prevent the parties from establishing contact.

To overcome such difficulties, systems exist whereby people view video tapes/pictures of prospective partners and/or assess common areas of interest such as hobbies, employment and so forth to determine their interest in the potential partner.

The introduction of both parties is only effected if both parties are willing to do so.

Unfortunately, for many people, the visual appearance and/or the stated personal interests are often not sufficient in themselves to overcome the feeling of unease or trepidation of a user from meeting such a potential stranger on a 'blind date'. The initial step itself actually approaching a dating service can prove too embarrassing for many people thus precluding them from being assessed by potentially suitable partners who do make use of the dating service.

Alternative means of matching potential partners include the use of personal advertisements placed in magazines, newspapers and so forth. In recent times, this has been extended to include use of the internet as a means of increasing the potential pool of suitable partners. In such advertisements, people provide a brief description of their own personality traits and interests and express their preference of such traits in potential respondents. However, such descriptions are often misleading or even untruthful and due to the lack of any independent means of verification available to the enquirer, such advertisements are often treated with a great deal of scepticism by potential users.

Various attempts have been made to enhance such dating services by computerising the recordal and organisation of various human characteristics, seeking to provide enquirers with candidates matching their desired lists of characteristics. None of the systems however overcome the fundamental reluctance of most people to initiate a relationship with a completely unknown individual.

People often become acquainted with their partner due to their environment, i.e. school, college work and so forth and/or due to contact through mutual friends. The most prevalent factor leading to the majority of human relationships is the existence of such a common bond, link or situation/circumstance, either directly or indirectly with the eventual partner.

The very act of establishing friendship with a particular person confers at least a partial affirmation of the person's character, judgement and personality without which the friendship would not have been established in the first place. By proxy therefore, it is widely felt that friends of a friend are also likely to meet the same criteria or standards which formed the basis for the established friendship. The common factor of having a mutual friend provides both potential partners with a degree of reassurance of potential compatibility and like-mindedness which is not discernible through known dating services.

Despite the advantages of seeking potential relationships with friends and friends of friends, it is generally impossible for people to attend all the social functions required to meet all the potentially suitable partners in such an extended network of friends. Furthermore, whilst many friends might be willing or keen to help match potentially suitable partners, they may not want to become duly involved themselves.

Although the act of seeking a romantic relationship may involve contact with an individual's extended network of friends, many non-romantic activities and/or decisions are also influenced by the individual's extended social network.

Contemporary living has confronted many individuals with a daily surplus of information. This bewildering array of choices and decisions vies for the individual's attention in almost every aspect of their work, recreation, and social lives. The vast majority of information sources received by most individuals is biased to some extent by commercial interests. Consequently, there is at least the perception the information may be incomplete, misleading or false. The lack of independent objectivity from these information sources leads to scepticism and/or a sense of futility, helplessness, or ambivalence in obtaining worthwhile advice. In contrast, a recommendation by trusted friend of a particular product, service or the like, is likely to be given far greater weighting. Such recommendations will often be accorded far greater significance than any number of expensive, professionally produced, and theoretically compelling advertisements/product recommendations.

An individual may seek a friend's opinion on a variety of issues, aside from commercial purchase issues. The choice of plumbers, dentists, lawyers and other suppliers for example, may be strongly influenced by personal recommendation. Whilst such specific choices may only arise infrequently, friends and acquaintances are often in frequent contact and may cover a wide range of matters, including opinions/recommendations on issues such as books, films, entertainment, restaurants, and many others.

Potential implementations which may benefit from such a system are potentially limitless and the above are given solely by way of example.

Various prior art methods have addressed these issues including:

U.S. Pat. No. 6,269,369 Robertson which teaches a means of implementing a computer-based personal contact manager that allows members to create and maintain contacts with other members and in doing so incorporate their contact details on their personalised address books. As further members join the group, their contact details are optionally incorporated in the address books of the existing members. Furthermore, any changes in the contact details of the members are automatically updated in the address books of the other members. However, the system is primarily directed to maintaining connectivity between individuals by updating their contacts details, rather than sharing information between members of a unique private personal network.

US 2002/0091538 Schwartz et al teaches a means of fundraising via a network of friends. However, the system is tiered in a pyramid structure, preventing meaningful any two-way exchange of information between members of the network. Each member seeks to raise funds from their other friends in a cascading fashion.

US 2002/0049816 Costin, IV et al also addresses the issue of fundraising, but does not provide a unique personal, private network through which its members may exchange information and interact.

WO 01/63423 Ikimbo, Inc teaches an "information and application distribution system (IADS)" allowing interaction and communication within defined communities. The system requires the installation of a client-side executable application for each member of the community. The community is an organised network rather than a personalised one and is not private.

WO 02/15050 Luth Research Inc teaches a method of conducting surveys and collecting information. The invention invites people to become part of a network of people wishing to answer surveys and is not a unique, private personal network that is unique to each user.

US 2001/0025253 Heintz et al teaches a multi-level award programme in which the internet activity of a enrolled user is tracked with award points being earned for various specified activities. Further bonus points can be accrued by the user from other "second, third, forth level" users and so on. Heintz does not teach any means of selective interaction within a group of entities known directly or indirectly to each other on a unique, private personal network.

WO 01/01307 teaches a viral-based marketing system for use over a computer network in which merchants of goods/services provide a commission to referral web sites according to the sales corresponding to the referred users. The system is not a unique, private, personal network suitable for selective interaction with the members who are all known, directly or indirectly to the user.

U.S. Pat. No. 6,327,572 Morton et al teaches methods for introducing potential customers to an information service having a voice-based interface and is specifically restricted to such audio systems. Therefore, the system does not provide for non-audio interaction of entities within a unique, private, personal network, nor for non-commercial activities.

WO 01/37232 teaches an internet-based match-making service between two people who already know each other, of each other, or met each other at a previous situation that can be described in sufficient detail to facilitate a match. This system does not relate to individuals who have not met though share a common link through an intermediary individual.

Other prior art systems include a great diversity of websites, networks and systems which enable users to interconnect with other users. However, none of the prior art provides a unique, private, personal network for use with a membership which is specifically tailored and personalised to the user and whose details cannot be discerned for an external source outside the network and/or without specific permission from the user.

All references, including any patents or patent applications cited in this specification are hereby incorporated by reference. No admission is made that any reference constitutes relevant prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

SUMMARY OF THE INVENTION

A social network system and method performed by a social network system accessible over a data network with a plurality of data input devices connectable to said data network, said social network system including at least one host computer and a database of entity data records each relating to a corresponding user entity and containing one or more entity attributes including at least one identifying characteristic of said corresponding user entity, said method providing a given user entity with a virtual, unique, private, personal, social network (hereinafter 'social network') formed from connections between contacts, said contacts being other user entities connected directly or indirectly to said first user entity; said method including:

communicating an invitation from a first user entity to one or more other user entities selected by said first user entity for inclusion in the first user entity's social network as a contact;

recording, in said database, each user entity accepting said invitation as being a direct contact directly connected to the first user entity by a first degree of separation;

determining that for:

any second user entity directly connected to the first user entity and any third user entity directly connected to the second user entity but not directly connected to the first user entity, the first and third user entities are determined as being indirect contacts, indirectly connected to each other with a second degree of separation;

repeating the above steps for a given user entity having a corresponding entity data record in said database, wherein said given user entity is equivalent to said first user entity in said repeated steps to create, for each said given user entity, a corresponding individual, unique, personal, virtual social network, thereby collectively forming a plurality of social networks on said social network system, inter-connected by mutually connected contacts; and providing a given user entity with searchable access to at least part of the entity data records stored in said database;

providing a given user entity with at least partial control of privacy of their individual, unique, personal, virtual social network with respect to a user entity seeking access to the given user entity's data record by permitting the given user entity to specify:
a connection factor between the given user entity and said seeking user entity and/or
one or more entity attributes of said seeking user entity, required to allow the seeking user entity access to said given user entity's data record;
permitting a given user entity to take a role of provider or participant in a predetermined activity and/or application via said data network, wherein
a provider is a user entity providing an item or service to at least one other user entity; and
a participant is a user entity utilising said provider's item or service.

BRIEF DESCRIPTION OF THE DRAWINGS

Further aspects of the present invention will become apparent from the following description which is given by way of example only and with reference to the accompanying drawings in which:

FIG. 2. shows a first embodiment flow chart implementation of the invention shown in FIG. 1;

FIG. 3. shows a web page forming part of the first preferred embodiment;

FIG. 4. shows an e-mail forming part of the first preferred embodiment;

FIG. 6. shows a web page forming part of the second preferred embodiment listing employment search results;

FIG. 7. shows a web page of an expanded job description of the results shown in FIG. 6;

FIG. 8. shows a user profile update according to the present invention;

FIG. 9. shows a web page form for inputting details of vacancy according to said second preferred embodiment;

DETAILED DESCRIPTION

Figure 1:
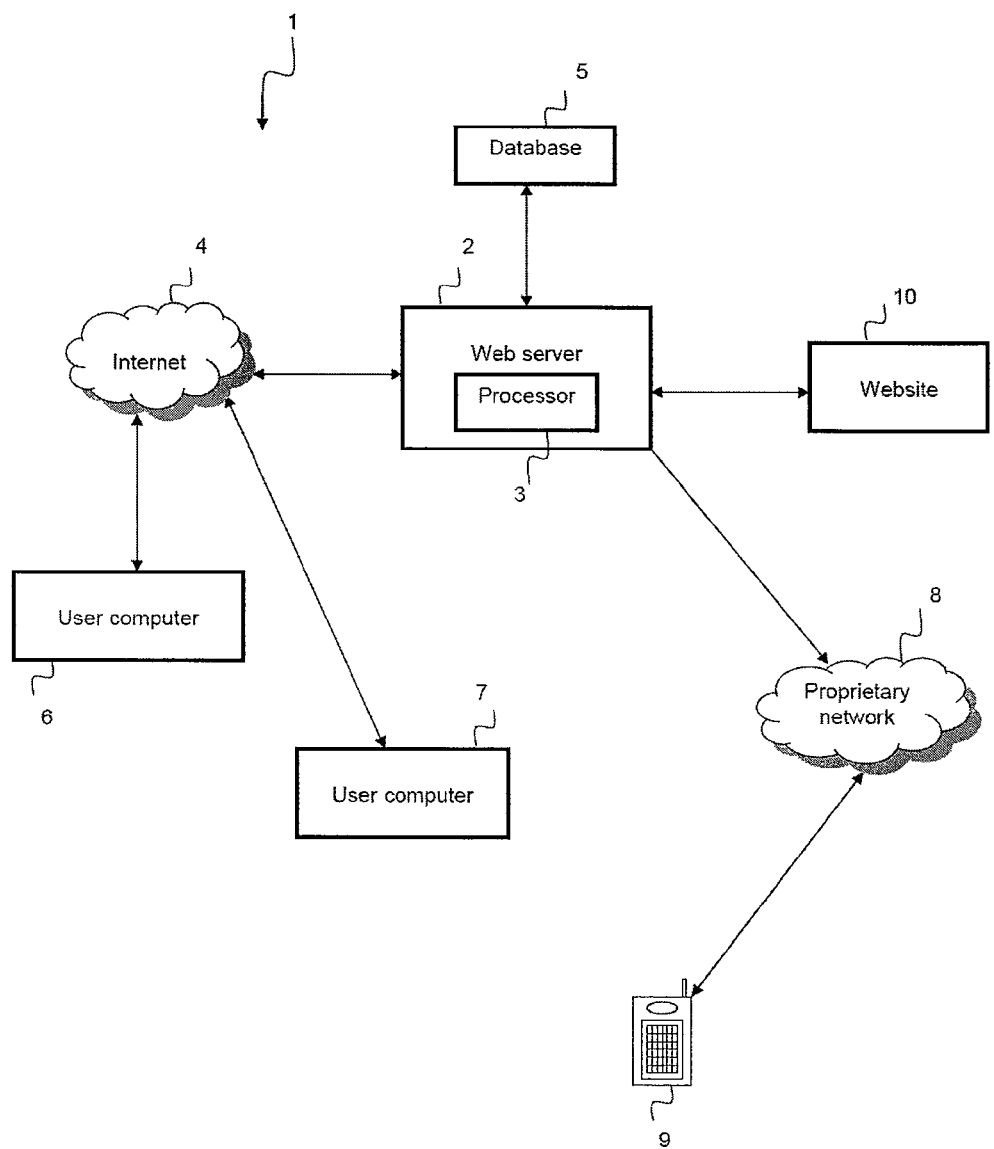
FIG. 1. shows a schematic block diagram of a preferred embodiment of the present invention.
Figure 5:
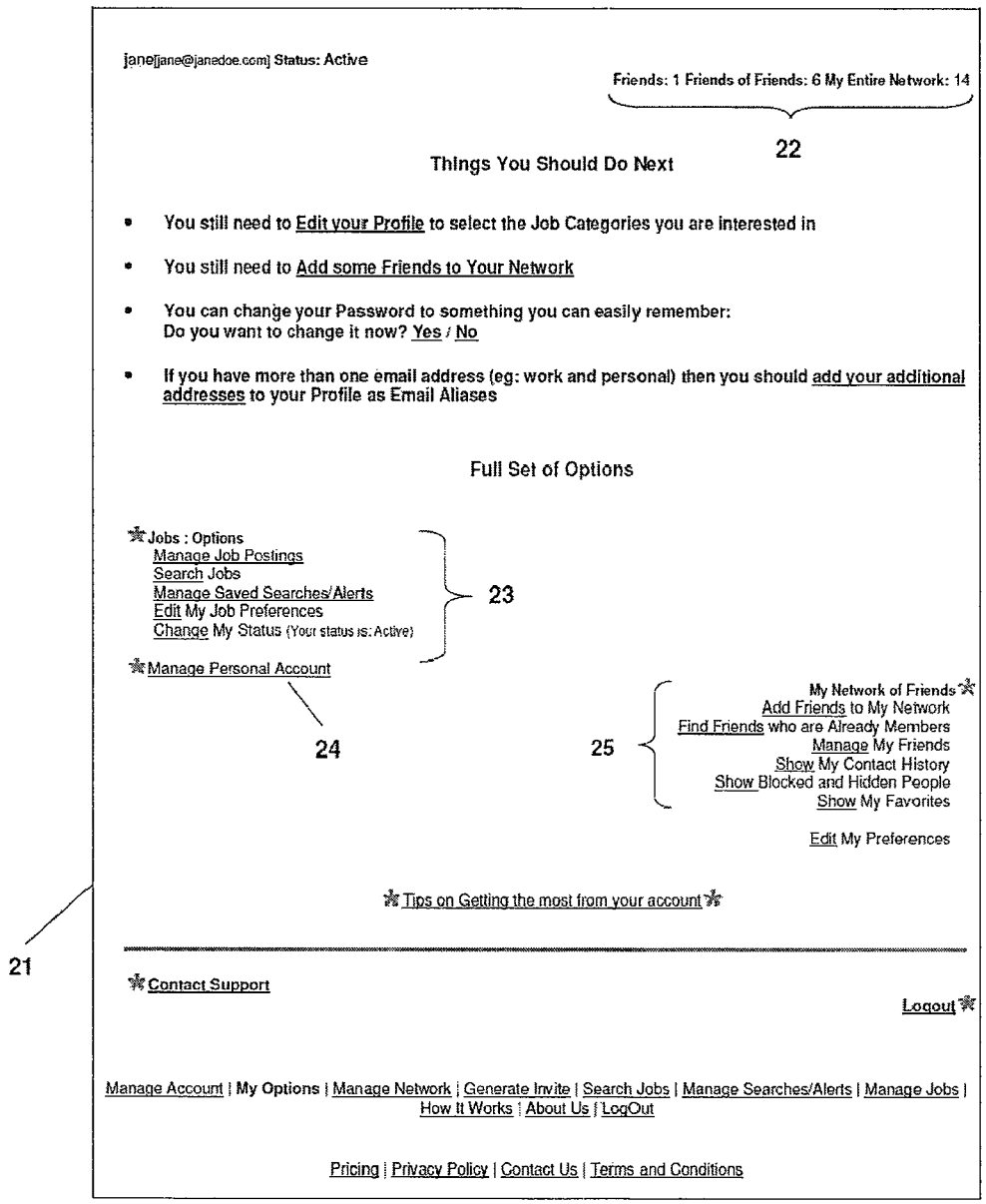
FIG. 5. shows a web page forming part of a second preferred embodiment of the present invention.

As discussed above, the present invention may be implemented in numerous forms and embodiments. However, common to each embodiment is a social network system including; at least one host computer processor connectable to at least one data network, a database accessible over said data network, and a plurality of data input devices connectable to said data network, said system configured to provided each user entity with a virtual, unique, private, personal, social network (herein a 'social network') formed from connections between contacts, said contacts being entities connected directly or indirectly to a user entity.

According to one aspect, the present invention provides system providing one or more users with a unique, private personal network formed from contacts with one or more entities known directly or indirectly to the user, characterised in that said unique private personal network provides respective interrelationship context information associated between at least two entities and/or between an entity and the user.

As used herein, the term 'entity' or 'entities' refers to any individual, family, personal or organised network, organisation, club, society, company, partnership, religion, or entity that exists as a particular and discrete unit.

By being private, the social network prevents unrestricted access to the information and the user entity's contacts contained therein, filtering out unwanted approaches by unauthorised entities.

Preferably, said system includes for each entity one or more entity attributes, including at least one identifying characteristic.

Preferably, said entity attributes include information regarding personal details, factors or interests; friends; relations; school alumni; employment factors; business colleagues; professional acquaintances; sexual preferences, persuasions, or proclivities; sporting interests; entertainment, artistic, creative or leisure interests; travel interests, commercial, religious, political, theological or ideological belief or opinions; academic, scientific, or engineering disciplines; humanitarian, social, security/military or economic fields and any combination of same.

Preferably, said interrelationship context information includes a connection factor indicative of the separation between entity contact and the user entity, and optionally also the separation between contacts in said user entity's social network.

Preferably, said identifying characteristics of an entity encompasses any communication means capable of individually communicating with said entity including, but not limited to, the entities name and preferably a means of contacting the entity, preferably including an e-mail address; telephone and/or facsimile number; postal address an/or any combination of such means.

The interrelationship context information optionally includes details of one or more entity attributes. Therefore, in addition to the user's knowledge that another entity is a direct contact (i.e. there is no intermediary between the entity and the user entity) or knowledge of the connections via which the entity is indirectly known/connected to the user (i.e. the connection factor), further interrelationship context information may be available via details of any corresponding entity attributes made available to the user It is thus axiomatic that said interrelationship context information self-explanatorily provides information about the context of the interrelationship between a connection between at least two contacts and/or between a contact and said user. More specifically, and in summary of the above, said interrelationship context information includes at least one:
entity attribute,
entity identifying characteristic, and/or
a connection factor indicative of the separation between two contacts and/or between a contact and the user It will be appreciated that there is a distinct difference in the present invention between organised networks and unique, private personal social networks. An organised network forms a group/organisation with a defined membership who all have a common aim, or interest such as, political parties, academic or engineering institutes, sporting bodies and so forth.

In contrast, a unique, private personal social network is formed from a combination of contacts that are unique to an individual with entities such as friends and colleagues. Thus, an individual user entity of the present invention may be linked to other user entity's unique, private personal social networks and be linked to (or even be a member of) organised networks.

Said organised network entities may be formed by groups of individual entities possessing one or more common entity attributes.

Thus, an organised network may be connected to a user's unique social network as;

a single entity with entity attributes relating to the whole organised network, and/or as a plurality of entities comprising the membership of the organised network, whereby each such entity would each posses at least the common entity attribute of membership of the organised network.

Preferably, access to the interrelationship context information between the user and said entities is restricted. According to one aspect of the present invention, said restricted access defined by the user.

According to an alternative aspect, the present invention further provides a tool to map relationship networks.

Entities, including the user entity may be considered as "nodes" in a network.

The invention provides a unique, private personal network with a plurality of users or entities represented as nodes, each node being at the origin of an individual unique, private personal network consisting of the user and a variable number of additional nodes.

Each node preferably includes at least one identifying characteristics of the corresponding entity it represents including the entities name and preferably a means of contacting the entity, preferably including an e-mail address; telephone and/or facsimile number; postal address and/or any communication means capable of individually communicating with the entity or any combination of such means.

According to a further aspect of the present invention, there is provided a means of visually displaying the interconnections between the nodes.

Preferably, a user's unique, private personal network may be visually represented on an electronic display in one or more of the following forms, including:

graphical, alphanumeric and/or animated symbols representing nodes joined by lines, or some form of visual link representing the connections between the nodes;

a solid line indicating entities who have joined or have consented to join the user's unique, private personal network;

dotted lines indicating entities who have been invited but they have not joined the user's unique, private personal network;

different symbols to differentiate between nodes representing different types of entities;

different symbols to depict nodes representing entities who are individuals and those representing organisations;

symbols at least partially resembling people to depict nodes representing actual individuals;

different symbols, colours, animations and/or sounds for a node to indicate the existence of defined information of interest including a particular predetermined activity, identifying characteristic, entity attribute, or other data recorded in a nodes data record;

different colours/symbols for different roles in a specific application, such as in an employment application for employers and job seekers and/or the existence of a link to details of a job vacancy;

displaying further defined information of interest or permitted actions when positioning a cursor or visual indicator over a node depending, and varying the information displayed depending on the user's degree of separation from the node;

nodes representing a person or an organised network also showing a numerical indication of the number of direct contacts associated with the node;

a indicative rather than literal indication of the number of links to a node if number exceeds a defined value, with a numerical value showing the actual number of connections;

user customisable representations for nodes, including images, photographs and figures;

different visual appearance of a node symbol to indicate the status of an activity, e.g. a higher intensity symbol indicating a successful linking of a job seeker with a vacancy;

Preferably said identifying characteristics also include at least one of said entity attributes.

Optionally, said identifying characteristics may include supplementary attributes of said user or entity.

The need for such supplementary attribute(s) is dependent on the specific purpose to which the system/unique, private personal network is being applied.

Preferably, a entity becomes a contact in the social network system by independent registration or by accepting an invitation from a user entity to become a contact directly connected to the user entity.

Entities agreeing to inclusion in a user's unique, private personal social network are said to be direct contacts.

According to one embodiment, entities included in the database system which are indirectly or unconnected to a user entity may become directly connected by mutual agreement, preferably by one entity sending an invitation and the other accepting.

As referred to herein, if two entities are linked through any number of intermediate entities they are said to be "connected". Furthermore, if two entities exist independently in the database system or an individual user entity's social network with no intermediate connecting entities are said to be "disconnected".

In one embodiment, the said connection factor incorporates the connection path length between two contacts, given by the number of connections in a chain of contacts separating two contacts.

In a further embodiment, the said connection factor incorporates the degree of separation between two contacts and is equal to the shortest connection path length of all the available connection paths between the contacts, wherein a direct contact directly connected to another contact is a "$1^{st}$ degree contact," and has a connection path length of one, two contacts connected via one intermediate contact are said to be "$2^{nd}$ degree contacts," and have a connection path length of two, and wherein any two contacts whose shortest connection path is via "N−1" contacts, with a path length of "N" have an "$N^{th}$" degree contact, where "N" is an integer.

According to one embodiment, an application or communication is initiated by one or more entities, and responded to by one or more further entities. According to a further embodiment, users may search for other entities that desire to conduct an application or communication, optionally selecting to be notified of future such events.

According to one embodiment, the present invention is configured to allow a user entity to apply a selective interaction with other entities for a predetermined activity by controlling the value of $N^{th}$ degrees of connections separating the user from a contact to be included, where N is a variable determined by the user.

Preferably, said predetermined activity includes instigating, continuing, terminating or responding to an application, search, communication, and/or selective information distribution.

Alternatively, a user engaged in one or more said predetermined activities may specify the activity to apply to
- all degrees of contact in the user's unique, private personal network, at any connection path length, or
- the entire system network of all entities, including those who are not connected to the user.

Preferably, said applications include (but are not limited to) consumer decisions, buying, selling, trading, loaning; finding flatmates/roommates, tenants; organising activities and events, recommendations/opinions including those related to films, plays, books, employment, services, tradesmen, accommodation, restaurants and the like, comparison and explorations of common interests, e.g. horse riding, snowboarding, etc; sharing peer-to-peer personal or business creative work or content, e.g. photos, art-work, literature, music; managing a club or society; locating/supplying/"blacklisting" providers of goods or services; business or technological advice unsuitable for publication; recruitment, job-seeking; estate agents; venture capital; collaborative ventures; referrals; police/security information gathering/informants; event manager; address book manager; search engines; headhunting; book mark service; spam filtering; car sharing; sales leads; market entry advice; real-estate; sharing personal or business files; company knowledge management; medical advice; travel organiser, lending/borrowing; house-sitting; baby-sitting; classified advertisements; finding musicians.

In addition, the present invention permits conducting applications with networks outside the system network.

This control over information distribution allows the user entities to balance the trade-off between the amount of visibility of the application or communication or search in their social network, and the degrees of separation between the user entity and potential initiating or responding entities.

It will be appreciated that there are numerous potential reasons for limiting the degrees of separation of entities contacted by the user for any predetermined activity, said reasons including, but are not limited to, social, economic, or political contexts such as trust, discretion, interest, association, preference, shared experience, ethnicity, religion, language, location, allegiance, alliance, treaty, politics, or government.

According to a further aspect of the present invention, access to at least a portion of the said identifying characteristics of each entity is restricted, optionally as a function of the connection factor.

In one embodiment, each user entity may only access the name and contact details of direct contacts in its social network. Optionally, each user entity can see for each of its direct contacts the number of direct contacts that they have, in order to recognise which of their contacts are successful and which are not in connecting to others, and to prompt them.

Optionally, a user entity can only see the number or partial name of contacts connected within each of the user's N degrees of contacts greater than the second degree of separation. This achieves two purposes, firstly it prevents user entities from inviting other entities to be direct contacts without the existence of an appropriate interrelationship context or relationship which predisposes the entities to be direct contacts, and secondly, it still allows two entities involved in an application, for example, to consult their direct contacts in the connection path that links them, and if necessary, their direct contacts can consult their direct contacts further into the linking connection path, to support the entities use of the application.

According to a further aspect of the present invention, communication between entities may be restricted to contact solely via the system according to the degree of separation between the entities.

In one embodiment, only a user entity's direct contact(s) are provided with the user entity's contact details enabling communication independently of the system.

Thus, entities known indirectly to the user, i.e. second degree contacts or those with a greater connection path may only communicate with the user via the system and are not given the user's e-mail address for example.

This provides a yet further screen for users from direct interaction with entities with whom they are not yet totally familiar. If the situation changes and an entity becomes trusted, better known to the user, they may be upgraded to a direct contact and given the user's telephone number, email address or similar contact details. Alternatively, a user entity particularly concerned with privacy may exclude even their first degree contacts from accessing their contact details. All contact would then be via the system.

The assurance that email (or other communication means prone to include unsolicited messages/correspondence) from the user's social network comes from a defined list of entities whose knowledge of the user's contact details is controllable by the user entity.

Thus, the present invention may be used as a filter for any form of electronic communication by prioritising communications from entities in the user's social network within a defined degree of separation, over other communications.

This effectively acts as a spam filter for e-mail, text messaging, voice mail, or any other means which identifies the communication's originator, which may then be compared with the user entity's direct contacts for example.

In further embodiments, the user entities may selectively control access to the identifying characteristics of itself and/or, with consent, any contact within a permitted degree of separation from the user entity. Preferably, said selective control is variable according on the predetermined activity being undertaken.

Although access to the identifying characteristics and connection paths of particular entities may be restricted to specific entities according to the configuration settings of the system and/or entities involved, nevertheless the system records and maintains these details.

Therefore, according to a further embodiment, the system automatically updates changes in the identifying characteristics, contact details, entity attributes, and any other data associated with and/or inputted by a user entity and records same in entity data records associated with each entity.

Thus, according to a further aspect, the system automatically maintains connectivity between contacts following changes in contact details and/or the integrity of any aspect of a predetermined activity dependant on the contents of said entity data records of the contacts involved by virtue of said automatic updating.

In one embodiment, the system auto-synchronises the contact details of contacts accessible to the user with electric contact details stored in any electronic or data storage media connected to the system, e.g. address books in laptops, mobile phones, PC and so forth.

Preferably, after a user entity has formed its own social network, it may vary the degree of separation of the contacts to be involved in a predetermined activity, without need to reconstruct the social network for each activity.

Even if a user entity is not active in building its network of direct contacts, its network may continue to evolve and grow or shrink depending on the invitation activity of other contacts it is connected with.

The said system provides a platform for developers to provide the user entities with applications and communication services. The system may also be provided to the user entity with an initial suite of specific applications and communication services.

There are clearly a myriad of possible applications where knowledge of a direct contact, or recommendation by, a trusted entity will affect the decisions of a user entity.

As an illustration, a commercial entity such as a multinational software producer may utilise a database composed of suppliers with a proven track record, e.g. secure credit history, prompt product delivery or low product faults. The user entity's $1^{st}$ degree may be asked for recommendations for further trade related entities, employment vacancies, collaboration request and so forth.

A police/security service database may include data on informants with a creditability factor assigned to each according to the assessment of other police/security agencies or individual of same. Other security agencies accessing the data would be able to infer a measure of credibility to the data from their degree of separation from the other agency and/or informant.

In addition to a user entity's awareness of the degree of separation between themselves and a given entity, various other information regarding the personal details and/or activities of other entities in the user's social network may be searchable or otherwise made available to the user entity.

Thus, the present invention also provides a user entity with searchable access to the system for information derived from a variety of sources, including that recorded in said data records, including the identifying characteristics, contact details, entity attributes, and said predetermined activities.

Also optionally searchable are various supplementary attributes detailing specific details of the entity relevant to a particular application or activity. As an example, in a romance/friendship related database, the supplementary attribute may include (but are not limited to) the following;
- marital or relationship status (e.g. single, married divorced, separated, de facto, single but uninterested in a relationship at present, and so forth);
- physical attributes;
- photographs;
- a rating, assessment, quantification, qualification, or comment on the or each said entity attribute from one or more chosen entities by the user.

Optionally said chosen users may prohibit the recordal of any or all details stored or potentially stored in their respective user entity data record from being searchable and/or stored on said database.

According to a further aspect, the present invention provides users with searchable access to the system to search for entities matching a predetermined profile composed of user-defined entity attributes, identifying characteristics, supplementary attributes, predetermined activities or any combination of same.

The present invention may also be used to contact and/or convey information to entities matching a said predetermined profile.

Thus, according to a further aspect of the present invention, said database is searchable for entities matching a predetermined profile.

In one embodiment, a number of core steps are applicable to compiling and using a database for different applications.

A first user entity inputs the details of all the entities (i.e. their friends, colleagues, family or anyone else they value in some way) they believe would be willing to be recorded on the database as chosen individuals, and specifies their e-mail address as their identifying characteristic and optionally 'friend' as the link between the parties.

Each chosen individual is then notified of their inclusion (or potential inclusion) in the database and optionally notified of the or each common factor liking them to the first user if this is not self evident, e.g. "you have received an invitation from your friend David to be recorded on [application specific] database and he invites you to input details (i.e. e-mail address) of your friends to the data base . . . "

The process is then repeated as each friend of the original user agreeing to participate provides the requested identifying characteristic information and their chosen friends are automatically contacted (via e-mail) in the same manner and invited to participate.

In one embodiment, said searchable access is available only to prescribed user entities.

According to one aspect of the present invention, the said prescribed users provided with searchable access of the database are determined by a defined eligibility criteria.

In one embodiment, said eligibility criteria includes being a paying subscriber to said system.

In alternative embodiments, the said eligibility criteria definition may be based on any of the above described entity attributes, identifying characteristic—including said, supplementary attributes or combination of same.

According to one aspect of the present invention, individual user entities may chose to optionally restrict access to part or all of their stored data in their entity data record to other entities with particular identifying characteristics, supplementary attributes and/or entity attributes.

In this manner, entities are able to alter their searchable details according to different applications—for example, an individual may be willing to be contacted by any search looking for photography enthusiasts but does not want unrestricted access to the fact they work for a genetic research laboratory.

Potential users of such a system can be reassured that they will be included in a unique, private personal social network whereby only others with a common connection (e.g. friends, friends of friends, or friends of friends of friends and so forth) will be able to access their personal details if they chose to make them available.

Furthermore, the system does not necessarily require the user entity to make contact with an entity located through a search of the system database. Instead, the system provides a means of informing the user entity of the existence of the located entity together with the knowledge of a common link, e.g. a shared mutual acquaintance.

Preferably, the system allows user access across a network, including the Internet, an intranet; wide and local area networks; a telephone or pager networks, telephone-based text-messaging or facsimiles; automated mail-server systems; power transmission networks, wireless networks; networks comprised of other telecommunication links: postal or courier services and the like.

It will be appreciated that the present invention may be used with a multitude of applications as given above. These include any application where an action may be influenced, or information sought, as a result of knowledge derived from an entity known, either directly, or indirectly to the user.

The present invention enables information flow not only between immediate acquaintances, but also with the subsequent tiers of entity acquaintances, e.g. friends of friends, friends of friends of friends, and beyond, to include even larger domains of entities. The core principles and elements of the invention, namely the ability to transfer information within a social network whose members are directly or indirectly known to the user, giving an interrelationship context to any information transfer, may be applied a diverse range of applications without need to adapt the principles of operation.

Multiple applications may be derived using a database comprised of data from the same entities by utilising different aspects of the entity interrelations. Moreover, the present invention enables user entities to record information about themselves and apply selective screening on who else may view the information, and from whom they obtain information.

In one embodiment, a user entity may choose or be assigned (by the system or another entity) a role in an application, or a said predetermined activity.

Preferably, the roles include at least one of provider, participant, or facilitator roles.

Although the exact nature of a provider, participant or facilitator role in an application will vary according to the specifics of the application, in general these terms may be defined as follows;

A provider is an entity with some form of tangible (e.g. a product to sell, a job vacancy, a house to let) or intangible (e.g. information, participation in a sporting event, emotional support for counselling, on offer of friendship/romance) item, element or service which they can contribute, pass on, give, sell, make available to another entity.

A participant is an entity utilising the provider's tangible or intangible item or service, e.g., obtaining from the provider (either directly or indirectly) a product, service, job, advice, recommendation, contact details, specific information, a relationship and so forth.

A facilitator or link is an entity facilitating a successful interaction between a provider and participant, e.g. an entity who forwards a job vacancy from a provider (an employer) to a potential participant (a job seeker) without seeking the product/service/activity from the provider for their own use.

Fees for use of the system may constitute a subscription, one-off payment, an on-going time-based payment, be based on the quantity or nature of database search results, or based on the number and type of successful outcomes from use of the services.

The system may also be used to reward user entities for their contribution in a predetermined activity such as linking potential employer with an appropriate employee. Thus, according to one embodiment, a reward is provided to an entity according to their success in fulfilling their designated role in a predetermined activity.

Preferably, a reward is given to a facilitator for aiding in linking a provider with a participant.

Optionally, the reward recipient is chosen by the provider or facilitator.

According to a further aspect of the present invention, said system includes;
at least one host computer processor connectable to one or more network(s),
a database accessible over said network(s),
a plurality of data input devices connectable to said network(s),
wherein said system is capable of forming said unique private personal social network for each of one or more user entities by receiving input from the said user entity including at least one identifying characteristic of the user entity and of one or more chosen entities known to said user,
recording said identifying characteristic of each entity including the user to form one or more corresponding entity data records in said database,
notifying the or each chosen entity of their recordal on said system and requesting input of at least one identifying characteristic of one or more further entities known to the or each said chosen entity,
recording the identifying characteristic of each further entity inputted by the or each said chosen entity to form further corresponding entity data records,
repeating the above steps of successive notification of further entities and recordal of the identifying characteristic of each further entity chosen as further entity data records,
providing searchable access to at least part of the entity data records stored in said database.

Searchable access to an entity data record may be restricted by the entity to other said prescribed entities.

Preferably, said data input devices are computer terminals, PDAs, telephones, mobile phones, laptops, notebooks, any other portable personal computing device connectable to said network, preferably but not limited to the internet. Said data input devices may provide webpage, e-mail, text message, DTMF tone, voice or video access to the said host computer or between entities and/or web-browsing access to said host computer via a dedicated web-site interface.

According to one embodiment, entities stored on said database may be periodically provided with indicative information relating to additional new entities with an entity attribute matching that recorded in the entities user data record, which have been inputted to the system since the entities' last system access and/or said automated periodic update.

Said indicative information may provide a simple numerical indication of new recorded entities, new or altered identifying characteristics or entity attributes of existing stored entities, or alternatively may include at least part of the details contained in the respective entity user data records of the new users.

According to a further embodiment, a referral chain formed by the sequence of preceding chosen entities sharing a common predetermined factor leading to the eventual choice of a particular entity for inclusion in the database may be recorded in the entity user data record.

According to a still further embodiment, anonymous references regarding a particular entity may be requested of one or more entities identified within the corresponding referral chain relating to said particular individual.

As potential users of this system may be reluctant to disclose some or all of the various entity attributes, identifying characteristics, supplementary attributes referred to above, a variety of incentives or reassurances may be provided according to the nature of the system. In a relationship/romantic implementation, a means of indirectly assessing the potential suitability of an individual for a relationship of some kind may be garnered by considering the prospective individual's response or opinion to various neutral or non-threatening issues, such as the user's favourite joke, quote, movie and the like.

Thus, in a further aspect of the present invention, an entity is prompted for a response to predetermined questions relating to non-sensitive, matters of opinion on neutral topics, said responses being stored as part of the entity data record searchable by said selected users.

A consequence of the information distribution systems prevalent throughout the world and the aggressive marketing of products and services are a potential overload of information. Filtering this information is a fundamental task to permit decisions on the numerous choices confronting a typical individual. The advice and example provided by our peers/close friends and relatives is a significant filtering technique employed unconsciously by most people. The present invention harnesses this filtering ability and the collective opinions and knowledge of an entity's extended network of contacts.

Thus, instead of compiling a searchable database purely for a single purpose, e.g. job finding, sporting interests, or friendship/romantic motives, alternative/additional applications may be layered onto the database. The additional data obtained from the entity's identifying characteristics may be used to provide users with the means of obtaining information related to any of the above applications from within their own unique extended unique, private personal network of contacts.

The present invention enables a more systematic access to the opinions, knowledge, recommendations and so forth of an extended network of contacts than would otherwise be possible without endlessly disturbing each contact.

Applications most suited for implementation of the present invention are characterised by;
 a high reliance on personal relationships;
 a significant need/problem to solve;
 a need to access an extended social, business, recreational, cultural or other restricted network but not the general public;
 networks with a large number of people;
 high inter-personal information flows; and/or
 a large number of people to co-ordinate; and/or
 the network members have insufficient time available to perform all their desired activities, or have insufficient time to communicate with or maintain connections with their personal contacts.

To effect a successful implementation of the present invention to a new application ideally requires the identification of the following factors;
 the different roles of the possible participants (e.g. employer, employee, facilitator/link, recruiter);
 any social rules that may apply (e.g. notification only for jobs of interest or when candidates enquire);
 any specific restrictions or special features related to the possible participants; and;
 the different motivations of different roles.

These factors may be readily used to adapt the core functionality of the invention in an open-platform software embodiment. This platform would enable third parties to develop network applications that link into it as well. Although these applications are currently implemented on an Internet and e-mail platform they are not necessarily restricted to same.

It can be thus seen that individual industries may adapt the present invention to their own peculiarities and characteristics. Personal or organisation networks are utilised by each Industry in different ways and to varying degrees. A Share broker and Venture Capitalists would use personal networks, though in a distinct manner and purpose. Nevertheless, by identifying what the unique, private personal social networks are used for, and the different roles played by individuals/organisations (i.e. entities) in the industry, the present invention may be adapted to enhance individuals/organisations effectiveness.

Different companies within a given sector of an industry may have specific criteria to define how their employees utilize their networks of friends and colleagues as part of their work. This could be as simple as a particular company template used for e-mail communication with other entities via the said database.

Using the Venture Capital example again, personal social networks may be used in a variety of tasks—some industry specific, some generic commercial tasks. These may range from senior executive recruitment, seeking specialized co-investment partners, conducting technical due diligence to ordering office supplies. However, in each instance, the present invention may be used to compile, maintain and update their list of contacts.

Furthermore, unlike existing information-gathering systems/techniques, the present invention allows the user to extend their information search (whether it be for a potential olive pressing plant investment company or a new office photocopier supplier) beyond their immediate contacts. Moreover, it also avoids incessantly interrupting all of their contacts whilst ensuring the potentially relevant ones are notified.

A key benefit of the present invention is the ability to layer information requests or dissemination with the user's extended social network of contacts according to the user's purpose. If an individual is embarking on a project requiring diverse and/or specialist input, then information requests may be restricted from clearly uninterested contacts. Thus, an individual organizing a working-party detail at a remote club ski-field for example, would exclude contacting any non-local individuals.

In this instance, the particular criterion used in restricting the database search results is geographical proximity. It may be seen that by adding additional criteria, e.g. "possesses four wheeled drive transport, physically able, an interest in the outdoor, a relevant craft/trade skill (welding, carpentry, diesel mechanic)" may further optimize the search. The available criteria depend on the information stored in the respective entity data records, i.e. the identifying characteristics, entity attributes and supplementary attributes.

A venture capitalist thinking of investing in a biotechnology project may only notify specific entities within their network. However, the same individual may want include different friends and colleagues in your "romance" and "employment" situations.

In an employment-orientated application, the user may notify different people within their network depending on the nature of the employment. As an example, finding a new sales person will undoubtedly engage a different part of a user's social network compared to seeking a new software database programmer. It may be appropriate to exclude certain individuals from a search, e.g. the superior of a disenchanted employee, where the user knows both individuals.

The manner in which a user controls information flow is adaptable to social or commercial change. A user may have close trusted friends who are categorised as able to see all information. Less trusted acquaintances may be accorded certain restrictions or qualifications, e.g., "don't invite Sam Dee to any function without Jane Doe".

It can be thus seen that the criteria forming the predetermined profile of an entity sought by the user may include additional 'external' factors from those stored in an entity data record according to a user defined 'rule'. These external factors may be extremely varied and diverse and include, for example, world or local events, the weather, time, anniversaries/birthdays or whatever factors or issues a user wishes to affect their activities.

As an illustration, a user may wish to automatically contact other individuals who snowboard for a backcountry trip, but only if the meteorological office indicates a 'powder day', or if there is no avalanche warnings. Whilst being a snowboarder could be stored as an entity attribute/identifying characteristic, clearly the snow/weather reports are externally generated and altered dynamically.

Therefore, according to a further aspect of the present invention, criteria for matching a predetermined profile in a search of said database includes one or more external factors, preferably according to one or more said user-defined rules.

As previously stated, friends and colleagues often ask each other for recommendations when selecting product and services, e.g., "do you know a good doctor, mechanic etc". These recommendations can be stored in an entity data record as either an entity attribute, identifying characteristic, or supplementary attribute pertaining to that entity.

This enables, for example, a user's friends to see what washing machine they recommended (or did not recommend) and optionally use a hyperlink connection to the manufacturers web-site, for example. Such a mechanism would enable a means of generating revenue from the product manufacturer.

In one embodiment therefore, the present invention records a user entity's recommendations regarding consumer items and/or services as part of the user's data record.

Preferably, a hyperlink connection to a web site of a manufacturer of a recommended product.

A variety of means are possible including, according to one embodiment, a financial, product or service reward is provided to an entity by a manufacturer according to a predetermined number of hyperlink accesses attributed to the user' recommendation.

Alternatively in a further embodiment, the manufacturer may directly subsidise the company hosting the searchable database system according to the total number of referrals, whilst optionally, the individual system users may receive a proportionally discounted subscription to the system.

Alternatively, the service and/or product providers receive a predetermined number of recommendations without charge after which they are invited to pay a fee to be maintained as a searchable term on the database. In use for example, a user entity may know his close friend has a particular brand washing machine. The user entity may then search to see who else has that particular machine rather than asking all his contacts on the database what washing machine they posses.

The service/product providers may be contacted informing them which entities contacted them directly via the present invention. This demonstrates to the service/product provider the value of this method for generating business, thus encouraging them to pay to join the service.

It is necessary to provide an incentive for entities to record their recommendations, or opinions of products and services. One method is for service/product providers to provide discounts to entities that recommend them. The present invention monitors all successful referrals and ensures the appropriate discounts are received by the relevant entities. Revenue is generated from a retaining a percentage of the discounted savings received from the service/product provider.

To facilitate ease of use, service and product providers using the present invention can use customizable emails that they send to happy customers. This e-mail includes a one click link to allow the service or product provider to be added to that persons list of recommendations. If the individual is not a user of the present invention, they are prompted to join.

The present invention may be expanded from an essentially web-email base system to incorporate a mobile voice connectivity component. In the simplest embodiment, the system of the present invention defines a social network formed by the entities stored in the database. This social network communicates via email and the web, and if voice communication is needed, the system users may simply telephone each other. No direct assistance is needed other than possibly viewing the relevant portion of other entities data record or being informed via a message (email, SMS, EMS, MMS, or chat, for example) of the other entity's phone number(s).

According to a further aspect of the present invention there is provided a method of creating a unique, private personal social network for a user entity using a system including at least one host computer processor connectable to at least one data network, a database accessible over said data network, and a plurality of data input devices connectable to said data network, said system being configured by said method to provide each user entity with a virtual, unique, private, personal, social network formed from connections between contacts, being entities connected directly or indirectly to a user entity, said method including the steps of:

said system receiving a user entity data input including at least one identifying characteristic of the user entity and recording said data input in a corresponding entity data record;

said system receiving a further user entity data input including at least one identifying characteristic of one or more entities known directly or indirectly to said user entity and chosen by said user entity for invitation to the user entity's social network as a contact;

communicating said invitation to said chosen entities;

recording each consenting entity accepting said invitation as a new contact connected to the user entity and storing at least the identifying characteristic of each new contact in a corresponding database entity data record;

repeating the above steps for each consenting entity to create corresponding individual, unique, private, personnel social networks, collectively forming a plurality of social networks on said system, inter-connected by mutually connected contacts;

providing searchable access to at least part of the entity data records stored in said database.

In a more sophisticated implementation, the present invention can offer automation of the dialing process and value-added services such as conferencing, messaging, and interactive voice response/premium-rate services.

In a further embodiment, the system further provides automated dialing via a Public Switched Telephone Network (PSTN) through a web-based function allowing the user to request the telephone network to make a call to two or more entities involved in a predetermined activity and connect them via a bridge in the networking the network. Automation through Internet telephony would allow the user to directly initiate an Internet telephony call to the desired parties.

Telephone conferencing may be used to facilitate combining the features and services of the present invention into a single call. Again, this can be accomplished through a PSTN conference bridge or Internet telephony.

Providing a voice mailbox to which a user could redirect their existing voice mail subscriptions could be used to supplement existing messaging facilities. The advantage of a social-network based messaging system is that it would be able to separate messages from within the social network from those from outside (assuming caller-id is available or authentication is used to distinguish members of the social network from those who are not members).

Interactive-Voice Response and Premium-Rate telephone services could be used to support such social network functions as event management and simple profile management.

Three key platform and implementation extensions are provided to extend social networks into the mobile environment: Mobile Notification Services, Data Application Services, and Location-Based Services.

Mobile Notification Services allow the user to optionally and selectively receive alerts to their mobile device. These alerts could be in the form of a Short-Message (SMS), Enhanced SMS (EMS), Multi-Media Message (MMS), plain email, a paging message, or other message format.

Data Application Services allow the user(s) to optionally and selectively initiate or receive data communications related to their social network(s). These communications could be via SMS, EMS, MMS, email, WAP, paging, or other wireless application data format.

Location-Based Services allow users to utilise the benefit of their social network taking account of their physical location. The user's location may be determined by mobile-phone cellsite location, GPS location, manual or menu-driven location selection, or other known methods.

An example service which takes advantage of all the above services is as follows:

User A is at a sports-stadium. He has previously selected on a web site link to the searchable database to be notified by SMS when his direct friends or friends of his friends who match a particular predetermined profile have their mobile devices active in the same cell-site as him for a minimum of 20 minutes duration. This time restriction eliminates people who are just traveling through the cell-site area.

User A receives an SMS that User B, a friend of his friend User C, is in the same cell-site. The SMS gives a brief biography of User B.

User A is interested to communicate with User B, but only after checking with User C about the person. Because it is time-dependent, User A needs to reach User C directly. In a simple implementation, User A will simply call or send a text-message to User C. In a sophisticated implementation, the system will give User A the option to be placed directly into contact via voice or data with User C.

User A reaches User C and User C replies positively to User A's interest in contacting User B. User A then responds to the original alert message with that preference. User B then receives a text message asking if User B would like to meet up with User A, a friend of their mutual friend User C. If User B responds positively, both User A and User B are sent messages which give their phone numbers, allowing them to contact each other. In a sophisticated implementation, they would have the option to be placed directly into communication.

The present invention relates generally to a means of harnessing the discriminatory powers of the knowledge, opinions and recommendations of an entities extended network of contacts in an efficient and systematic manner and without irritating or alienating members of the network. There are numerous potential implementations for the present invention of which the examples described in more detail below are by way of illustration only.

FIG. 1 shows a schematic block diagram of a system for providing connections between entities, implemented on a computer system (1) according to a first embodiment of the present invention.

The term 'entity' or 'entities' includes any individual, family, organisation, club, society, company, partnership, religion, or the like that exists as a particular and discrete unit. However, though for the sake of clarity and convenience the term individual or user entity (as appropriate) is used in the following examples, this does not restrict the present invention to same.

The computer system (1) includes a host computer in the form of an Internet web server (2), containing a processor (3) connectable to a network, in particular the internet (4), a database (5) accessible over said network and a plurality of data input devices, represented by user entity computers (6, 7).

It will be appreciated that by those skilled in the art that the invention is not necessarily limited to use with the internet (4) and that a connection to the host computer/web server (2) may be provided by a propriety network (8) enabling access by via text-messaging telephones (9) for example.

The present invention provides system providing one or more user entities with a unique, private personal social network formed from connections between contacts being entities connected directly or indirectly to the user.

Thus, the present invention is particularly suited to implementation in a variety of implementations, including, as an example, a relationship service to facilitate the introduction of individuals from a user's unique, personal private network. In dating-type service or system embodiment, the users would be drawn from friends or friends of friends, or even optionally friends of friend of friends and so forth.

Existing dating services are hampered by the instinctive reluctance of many users, or potential user's to engage in relationships with individuals of whom they have no prior knowledge. Attempts to overcome this difficulty have been predominately based on systems which record various personal details of the users to provide a basis for filtering potential partners based on the perceived suitability of the recorded personal details.

However, most people's friendships (both platonic and non-platonic) are formed with other individuals with whom they respect, feel comfortable with, whose company they enjoy, with a compatible outlook, sense of humour/beliefs and/or a host of other traits. A friend's friends are thus, widely perceived to be people with a similar outlook/character to the friend in question. Therefore, even if a friend's friend is unknown to an individual, the existence of the mutual friend between the parties mitigates much of the above-mentioned concerns.

It will be appreciated that the same principals of using an extended social network of acquaintances as a means of locating a particular individual can be extended to a plurality of non-romance related areas. As an example, people seeking a particular type of tradesman such as an electrician, confronted by a potentially random choice from listings in a phone book would often be very willing to choose an electrician recommended by a friend. The principle is equally applicable across a huge range of human activities/endeavours and is a fundamental feature of many societies.

The use of the system (1) for romantic purposes illustrated in FIGS. 1-4 nevertheless illustrates the operation and characteristics of the present inventions.

FIG. 2 show a flow diagram symbolising the implementation of the present invention of the system (1) as shown in FIG. 1, wherein an individual having an extended personal social network of friends wishes to identify potential relationships from within said network.

To initiate the process, the individual accesses the host computer/web server (2) via the Internet (4) using a user computer (6) and is connected to a web site (10) interface with the service.

In the initial step 100 the individual enters his/her identifying characteristics (11) which preferably includes a means of contacting the individual, preferably via e-mail and their name. This is recorded by the systems (1) as part of an individual data record (12) unique to each person and stored or updated on the database (5) in step 101.

As discussed above, in the present embodiment, the system (1) is primarily directed towards a single application-specific system, i.e., to facilitate romantic relationships between individuals, and the website (10) and associated correspondence/communication between the users will reflect this single purpose. It is therefore not necessary for the user to specifically record the reason/object for using the service, nor any entity attributes (13) of the individuals stored in their respective data records (12).

Furthermore, due to the fundamental premise of the system (i.e. joining a personal network of composed of entities/individuals all of whom are known to each other either directly or by at least one other common entity/individual), the system can operate if necessary with minimal personal information being disclosed by the individual.

However, in alternative embodiments, the system (1), may be configured to further categorise individuals by entity attributes other than just the existence of a common friend/contact.

These factors may encompass the full gamut of human interactions with each other and may include family relations; business colleagues; professional acquaintances; sexual preferences, persuasions, or proclivities; sporting or leisure interests; religious, political, theological or ideological beliefs; academic, scientific, or engineering disciplines; humanitarian, social or economic fields and any combination of same.

Such entity attributes (13) may be recorded in step 101 as part of the individual's data records (12) on the database (5).

After entering the user's identifying characteristic (11), the user selects one or more chosen individuals from their network of friends in step 102. Each said chosen friend is then notified by an e-mail as shown in the exemplary email illustration represented in FIG. 3. The e-mail notification (14) effected in step 103, conveys to the recipient a brief outline of the service (15) together with a request (16) for their participation (step 104).

No individual data records (12) are recorded/stored for recipients choosing not to participate (step 105) or simply wishing to help their friends without their own details being accessible to others. Individuals willing to participate are invited (17) to enter details of their own friends in a repetition of step 102. The details of the chosen friends entered, i.e., the identifying characteristic (11) in this embodiment are the friend's e-mail address and name. The individuals chosen for contact are notified by e-mail in a repetition of step 103.

The whole process (as described above in steps 102-105) of notifying friends, recording the details of willing participants as individual user data records, and contacting the chosen friend's friends and so forth is successively repeated in this manner until the full extended network of friends has been contacted.

Within a typical extended network of friends, there may be single individuals seeking relationships, single individuals not actively seeking a relationship, couples, separated couples, and so forth. Prescribed individuals meeting certain eligibility criteria are invited to register to obtain searchable access of the database (5).

In the present embodiment (and as shown in FIG. 2), the said eligibility criteria for registration is whether that the individual is single (step 106).

Individuals meeting this criteria, i.e., they are single (automatically detected by said processor (3) reading said data records (12) in the database (5)) are sent an e-mail notification (18) (as shown in FIG. 4) in step 107 to invite them to register for searchable access of the database (5). If user is recorded as not being single in the individual's data record (12), no invitation for registration is sent—step 108.

In the example represented in FIG. 4, the e-mail (18) includes the option (19) of restricting the information in their own individual data record to be available to just 'friends of friends' or 'friends of friends of friends', i.e. individuals of $2^{nd}$ or $3^{rd}$ degree of contact separation from the user. It also permits the user to register the type of relationship they are interested in via a selection menu (20).

This key feature of the present invention enables a user to apply selective control over the type of interaction with other system users depending on their degree of separation from the user.

It will be apparent to one skilled in the art that many variants of the described embodiment are possible without departing from the scope of the invention.

In alternative embodiment (not shown), any of the users may input a variety of supplementary personal attributes/information as part of the identifying characteristics (11) including their including marital or relationship status (e.g. single, married divorced, separated, de facto, single but uninterested in a relationship at present, and so forth); physical attributes; photographs.

Furthermore, close friends (i.e. direct contacts), as opposed to friends of friends, may be offered a means of recording a rating, assessment, quantification, qualification, or comment regarding the details stored in the relevant individual data record (12). This can provide a means of limiting any excessive boasting/hyperbole or reticence/down-playing by an individual and thus provide a more accurate description.

It should understood that the system (1) does not specifically require the user entities to contact each other via the Internet, rather, it provides the information required (e.g. a common friend) to contact an individual with whom the inquirer is known to share a common link.

Even though many user entities may find e-mail to be a convenient means of contact, there is nothing precluding the use of the telephone, letter writing, personal contact or any of the 'conventional' means already available to the public. Such contact details may simply be recorded as part of the data (12) records and made searchable to prescribed users.

The invention possesses several security features not shared by existing 'dating-services'. Firstly, only individuals sharing a common link (e.g. friendship) are able to obtain access to another individual's personal details, i.e. their data record (12). No information is disclosed to the 'outside world'. This greatly reduces the concern and likelihood of approaches from 'crank individuals', whether perceived or actual.

Secondly, the system does not rely on the user entities inputting large amounts of personal and potentially private information into a database over which they have no access control. Many users may feel less threatened by recording the minimal information needed on the database (5), particularly with the reassurance that the information is only viewable by friends or friends of friends (or friends of friends of friends).

Further features or embellishments to the basic system include cross checking the details of new individuals proposed for inclusion on the database to see if they are already present. This prevents people receiving unwanted duplicate e-mail requests (14) to join the service.

Eligible individuals, i.e. single friends meeting a particular search criteria may be listed with the along with the path of referring friends to provides a sense of context and background information. User entities can be provided with the option of whether they want their referring friends to be 'attached' to them in this manner.

Registered users may be notified periodically about the number of new eligible individuals included in the service since they last used the service and/or we last notified.

User entities may customise the format of the e-mail notifications (14) to suit their own tastes. As will be seen in the outline of the service (15) shown in FIG. 3, there are two drop-down boxes to enable the user to customise the characterising description of the service and the salutation with the minimum of effort.

If a user entity dislikes a particular individual within an extended network of friends, they may deny to access of their individual data details during any search of the database (5) conducted by said particular individual (or not accept a link to them in the database (5) at all).

Instead of accessing the service via the internet (4), any proprietary network could be employed such as an intranet, wide and local area networks; a telephone or pager networks, telephone-based text-messaging or facsimiles; automated mailserver systems; power transmission networks, wireless networks; networks comprised of other telecommunication links: postal or courier services and the like.

The now widespread text-based phone-messaging feature of telephones, particularly mobile telephones (9) can be utilised as a convenient and attractive means of accessing the service through a proprietary network (8).

Instead of each user instantaneously sending their e-mail requests (14) to the friends chosen for possible inclusion in the service in 'real-time', these may be grouped together so that an individual receives a single notification indicating all the friends who have recommended them.

A further variant of this feature is to periodically notify a user entity of all the other individuals who have registered and who want to refer to the user as their friend.

A 'referral chain' of individuals connecting two people provides a means for both parties to inquire about each other through any of the parties in the referral chain. This provides a means of obtaining further information about an individual before committing to a date/meeting. This essentially mimics the age-old social mechanism whereby friends are used as intermediates or envoys to discover details of potential mates/partners.

A means of extracting information from an individual's on which character assessments may be made is possible by means of obtaining response from said individual to a range of questions on neutral, mainstream, non-threatening or non-sensitive issues. Such questions could relate to the user's favourite joke, quote, movie and the like. Said responses may be stored as part of the individual user data record and may be searchable by said selected users. This avoids the understandable reluctance of many potential users to divulge personal, private and/or physical details to the scrutiny of third parties.

The entry of an expanded list of identifying characteristics/entity attributes (11, 13) as referred to above can enable the user entities to contact other people for non-romantic purposes. This may range from golfers seeking like-minded playing partners to lawyers seeking reliable associates in overseas jurisdictions.

The recommendation of a friend or colleague or even indirectly by someone (even if not a direct acquaintance) whose judgement is respected can greatly influence people's action and choices. The choice of say, a builder, dentist or mechanic for example may be influence by acquired personal experiences or by reputation, and/or recommendation. The latter option is often given preference due to the greater potential impartiality and its ability to draw on a wider pool of personal experiences.

The present invention is readily adaptable to such relationships, and in fact, may be utilised in facilitating interaction between parties in almost any sphere of human activity, provided the parties share a common connection (either directly or indirectly) with an entity which is respected by the said parties.

As discussed, specific applications may be formed from the core features set of features of the present invention.

Table 1 below contains an exemplary list of possible applications.

TABLE 1

| Application | Problem solved | Roles | Application-specific factors |
|---|---|---|---|
| Employment | Finding high quality people for jobs at a low cost | Employer, Employee, Facilitator/link, Seeker/candidate, Recruiter | Best employees and or jobs are often found through the referrals of friends and colleagues |
| Romance | Finding a partner | Single, Facilitator/Link | The majority of people find their partner via common friends and colleagues |
| Flatmate (Roomate) finder | Finding a trustworthy and interesting person to live with | existing flatmates, New flatmates, Facilitator/Link | It is better to choose someone you know compared to an advertisement in the paper where you do not know the person at all |
| Investment opportunities | Finding investors with skill and desire to invest in particular areas | Offerer, Investor, Consultant, Facilitator/Link | A large proportion of private equity is placed via personal networks and would benefit from a more systematic system. An optional additional requirement is the person posting the investment opportunity gives specific approval to each entity in the personal network wanting to view the information |

TABLE 1-continued

| Application | Problem solved | Roles | Application-specific factors |
|---|---|---|---|
| Recommendation engine for movies, books, plays etc | Finding good entertainment | Reviewer, Link/facilitator, Entertainment seeker | Friends often ask, "have you seen any good movies, read any good books" and this makes it easy to see what people think is interesting and worthwhile. |
| Event manager | Way for people to organize gathering and find people to make up numbers | Organizer, participant, Facilitator/link, person with interests | When organizing sports teams etc it is time consuming to call around a see if everyone can make it. This service may be configured to cease issuing invitations to the event after a defined number of people had confirmed their attendance. |
| Service and product recommendation engine | Way to find good product and services to buy and those to avoid | Service/product provider, consumers, Facilitator/link | This provides an an alternative to scanning telephone or trade directories for product or providers. Users prefer recommendations from their personal network of contacts. |
| Academic collaboration | Way to keep up to date in a research field | Academics, Facilitator/links | There are numerous ways academics use networks to collaborate on performing, writing up and presenting research. This helps them |
| Contact manager | Keeping your contact information of friends and colleagues up to date | Friends and colleagues | This feature could sync your local address book with an online one. Because you are linked to your friends via the social network when they change their contact details it updates them online and then updates them on your local computer when they sync the address books. You will always have their updated contact information |
| Business problem solving | Way to find information from business colleagues and share information | Question askers, question answerers, moderators | When you have a specific problem you often ask colleagues for the answer or who to go to for the answer. With this service you can sign up to different areas of interest and choose what discussions you want to participate in based on your network of colleagues. |
| Finding company Directors | Find trusted business people for this role in companies | Potential directors, Boards seeking directors | These positions are often filled via word of mouth. The present invention would make the process more systematic |
| Spam filtering | Problem of receiving unsolicited emails | | Emails that come from your extended network of contacts could automatically be a higher priority than other email. Email that comes from addresses that is not part of any trusted network would be further lowered in priority (defined as spam). |
| Car pooling | Finding someone to share a ride with either for commuting or other purposes | Drivers, travelers | Generally people prefer to share a car with someone they trust than a total stranger. |

TABLE 1-continued

| Application | Problem solved | Roles | Application-specific factors |
|---|---|---|---|
| Generating sales leads | Finding people in companies through mutual contacts that can help with the sales process | Sellers, potential customers, Facilitator/links | Often sales leads are generated through mutual contacts. |
| Real Estate | Finding good tenants for properties | Landlord, tenants, Facilitator/links | Landlords prefer to have tenants they can trust and they would prefer to have people that are part of their extended network of contacts. Similarly tenants may prefer a trustworthy landlord |
| Travel Organizer | Find good places to stay and things to do when you travel | Traveler, travel supplier, Facilitator/links | |
| Babysitting | Finding a good babysitter | Babysitter, caregivers, Facilitator/links | |
| House sitting | Find someone to look after your house when you are away | House owner, house sitter, Facilitator/link | |
| Classifieds | Buy sell or trade property, products, and services | Buyer, seller, Facilitator/link | |
| Sharing private peer-to-peer content | Share your content with selected degrees of your contacts | Provider/ requester | Many people create or share content with others but do not want to use traditional peer-to-peer systems which are open and subject to abuse. |

In a second embodiment, an employment-related application is shown, as illustrated in FIGS. 5-10.

The employment application may operate as a stand-alone application or, as shown in the drawings, be layered onto other applications such as the romance/friendship application described above using the same system (1). The basis for the application is founded on the same principles and core functions, i.e. using the knowledge, experience, contacts, opinions, or recommendations of an entity's unique, personal private network of contacts to enhance the effectiveness of their activity of interest.

As discussed earlier, finding employment or the right applicant for a vacancy can be a frustrating and often futile task. The searchable database system (1) (as shown in FIG. 1) of the present invention maybe utilised to address these difficulties for either task as follows.

In this embodiment, corresponding elements of system (1) are like numbered. The system is again described with reference to an Internet (4) based platform, though again, the invention need not necessarily be so restricted. The database (5) may be populated in the same manner as described in the first embodiment with data records (12) relating to entities known (directly or indirectly) to each other. Once compiled, such a database (5) may be effectively reused for quite distinct purposes.

The various entity attributes (13) and/or identifying characteristics (11) (including any supplementary attributes) entered into the individual data records (12) provide a means to discriminate information flow between relevant employment entities/individuals. A user accessing the website (10) to seek potential job vacancies and selecting an appropriate hyperlink from the home page will be brought to the web page (21) shown in FIG. 5.

In addition to pursuing a search for employment vacancies, the user is offered choices on managing their own unique, personal private network referred to in the illustrations as the user's unique, personal network formed (in the FIG. 5) from their friends and friends of friends. A numerical status indicator (22) in the upper right of the page (21) keeps the user informed of the total number of contacts in their personal network, also indicating the potential number of recipients of a search they may conduct.

A further restricted list of options (22) prompts the user to edit their profile, i.e. their data record (12), add additional friends to the system (1), alter their password and/or their contact details (one of their identifying characteristics (11)). Under a further "Jobs: Options" (23) list of options, the user may select from the following job related options;

Managing Job postings;
Searching Jobs;
Manage saved searches/alerts;
Edit User job Preferences; and
Change User Status.

Access to the expanded list of all the available user options may be accesses via links entitled "Jobs: Options" (23), "Managing My Personnel Account" (24) and/or "My Network of Friends" (25) links.

However, assuming for convenience that a user wishes to search for a job and selects the relevant option, they are taken to the 'Job Search' web page (26) shown in FIG. 6.

At the job search-criteria web page (26), the user is able to specify (via selectable options (27)) search restriction criteria such as job category, geographical region and one or more identifying characteristic (11)/entity attributes (13). In the embodiment shown, the identifying characteristic (11)/entity attribute (13) is the link between the user and the potential recipient, e.g. friend of a friend and/or a friend of a friend of a friend. Searches may be saved for future use, and previous searches recalled using their respective icons (27, 28). The example shown in FIG. 6, the web page (26) is showing a result summary (30) of a search conducted on the criteria specified in above options (26).

In this example, a single job vacancy has been found by the search. The summary of the job details indicates the vacancy was posted onto the system (1) by "Julian, a friend of John (a friend known to the user Jane), together with basic job details. If these sufficiently interest the user, the full vacancy details may be obtained by following the job title hyperlink (31) that leads to the web page (32) shown in FIG. 7.

In addition to giving an expanded description (33) of the job vacancy, the web page (32) also provides an identifying characteristic (11) of the individual posting the vacancy, i.e., Julian's e-mail address (33). Also given are the connection(s) (35) between the user and Julian. The user thus has the choice of contacting Julian, the vacancy poster, one of their mutual friends, as identified by the connections (35), or enquire directly to the company advertising the vacancy via a dedicated link (36).

The vacancy poster Julian may optionally withheld his e-mail address (34) from being visible to some or all of job seekers.

It will be appreciated that the above search procedure may be easily adapted to other applications in addition to those of romance or employment illustrated.

The various entities/individual users of the system (1) may specify their interest in particular types of employment (as an identifying characteristic/entity attribute (11, 13)) by updating their profile i.e., their entity data record (12) accordingly. This information may be used by another user as a criterion for inclusion in vacancy notifications.

FIG. 8, shows a web page (37) used for updating a user's profile (12). As this embodiment particularly refers specifically to employment, the primary selection available to the user is a selection of vacancy types they may be interested in via a drop-down box (38). Clearly, alternative or additional information may also be recorded in further embodiments.

Figure 9:
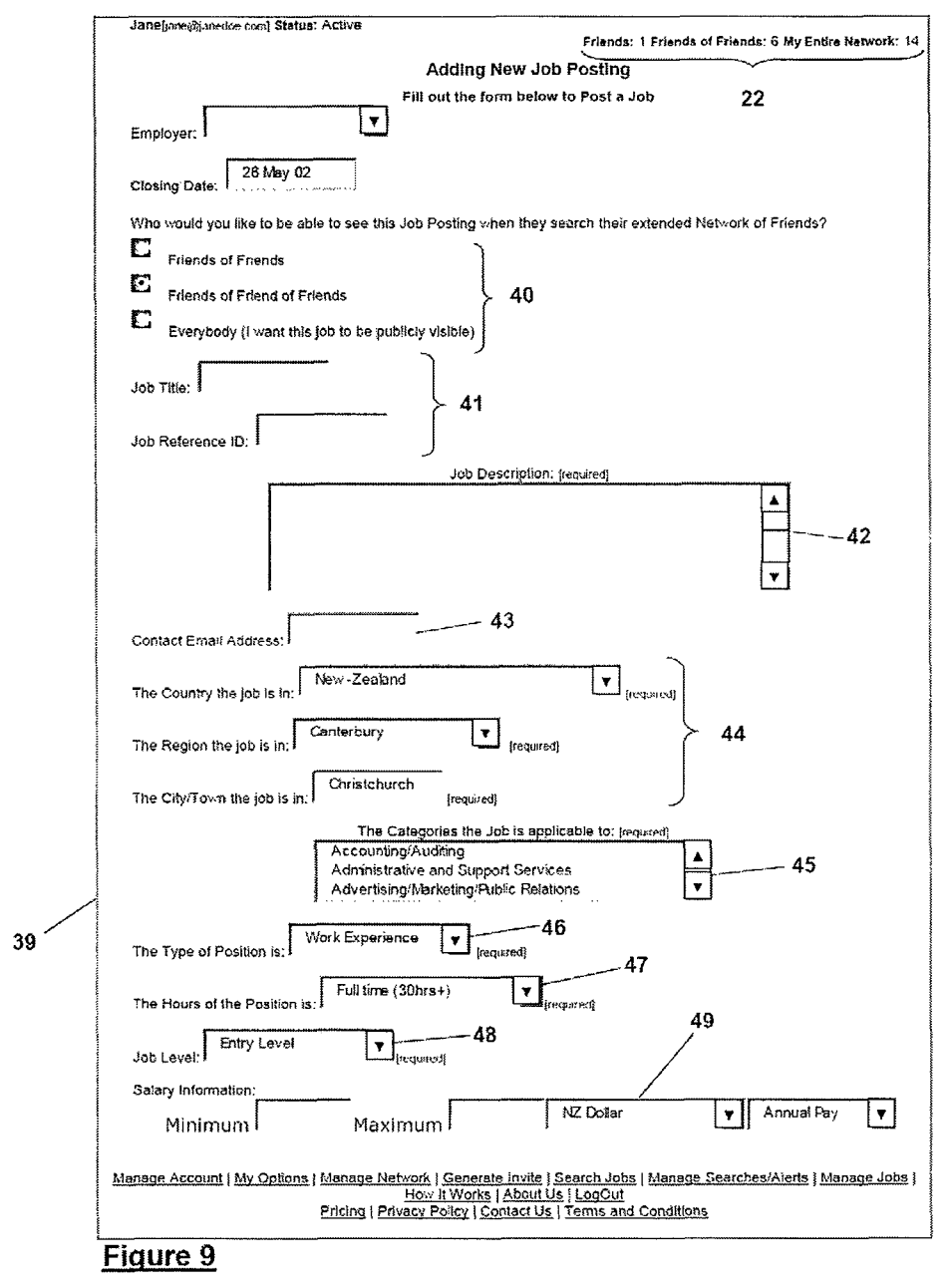

In the case of an individual or company wishing to circulate a vacancy amongst their network of contacts, FIG. 9 shows a further web page (39) for defining the vacancy details. Again, the user is able to restrict the circulation of the vacancy to friends, friends of friends, or everyone via appropriate checkboxes (40). The user is provided with various optional and required inputs, including a job title/reference (41), job description (42), contact e-mail address (43), geographical location of vacancy (44), generic vacancy category (45), vacancy type (e.g. casual, permanent) (46), expected hours of employment (47), vacancy level (48), and maximum, minimum and annual pay (49).

Figure 10:
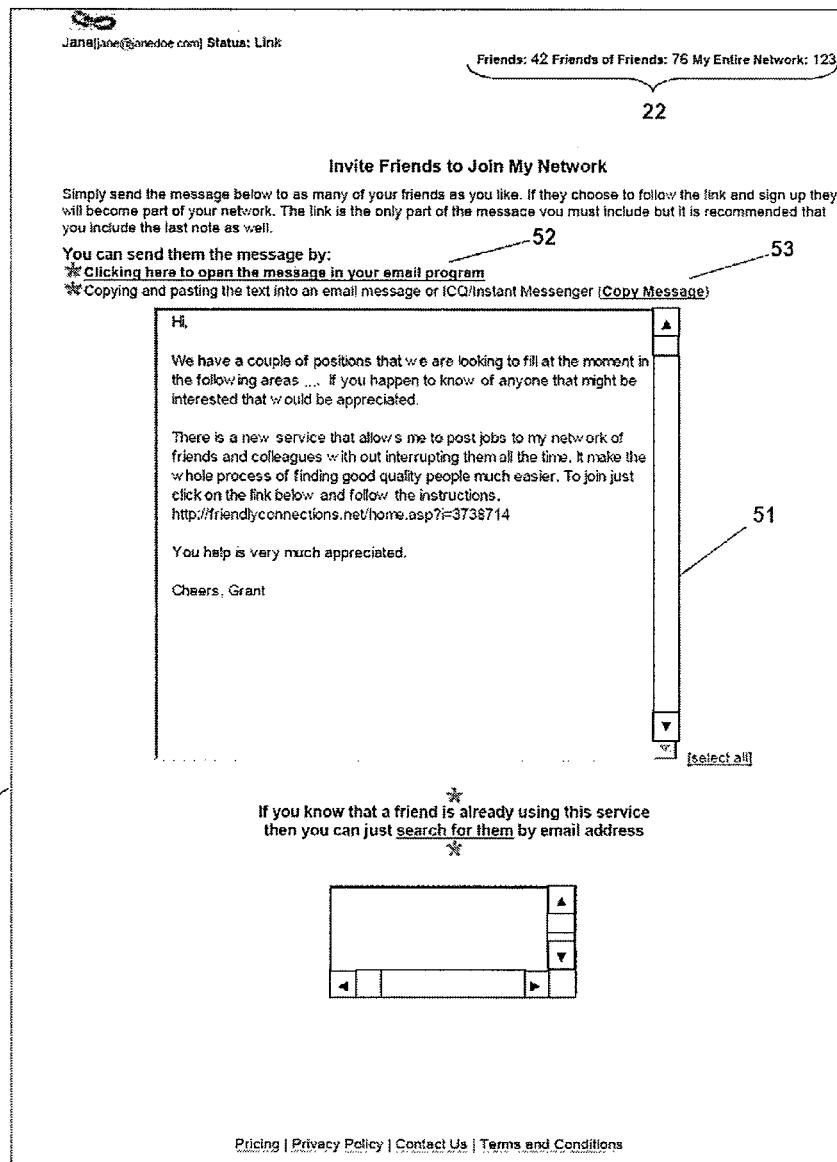
FIG. 10. shows a invitation message template according to the second preferred embodiment.

The primary mechanism for new users to join the system (1) is through contact with existing members. This may be performed as part of the act of seeking a vacancy, seeking an employee, or as a facilitating/link individual who facilitates contact between the relevant parties. FIG. 10 shows a further web page enabling a user to send an appropriate invitation to their friends/colleagues/acquaintances, with a customisable text message. In FIG. 10, the proposed text (51) is worded to indicate the user has some vacancies that need filing. However, the text may be replaced, edited within the user's own e-mail editing program if desired by selecting an appropriate link (52), or pasted directly into an e-mail or ICQ/Instant messenger service if desired via a further link (53).

Figure 11:
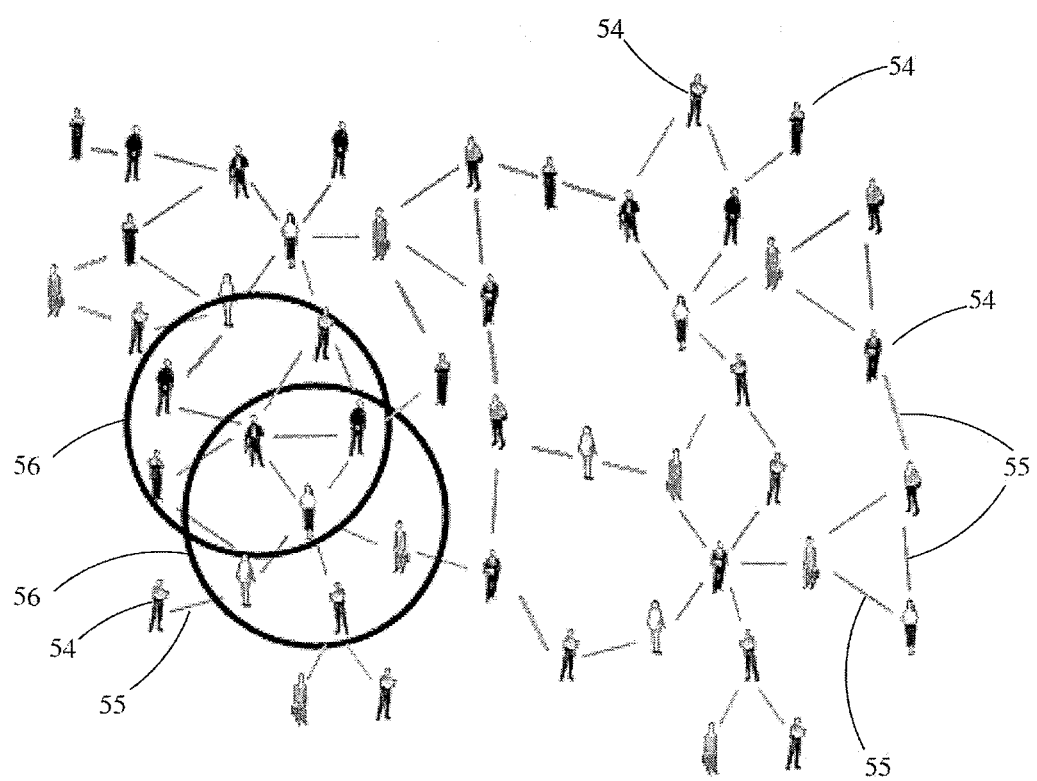
FIG. 11. shows a visual indication of a network of connected individuals highlighting two interconnected unique personal networks of first order friendships, and FIG. 12. shows the network displayed in FIG. 11 with a single user's second, third and fourth degree connections highlighted.
Figure 12:
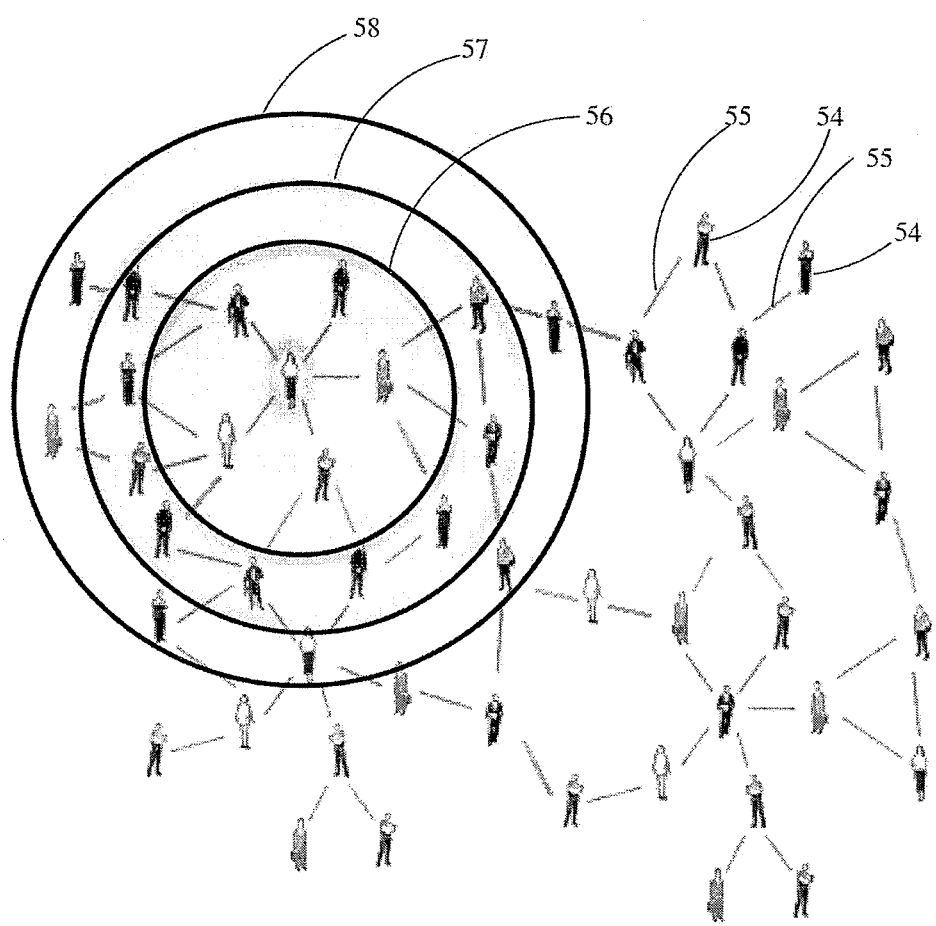

FIGS. 11 and 12 show a graphical representation of the networks referred to throughout the patent whereby the relationships between individual entities (54) are illustrated by interconnecting links (55). It will be apparent that each individual has their own unique private network which differs even from those to whom they are connected, as illustrated in FIG. 11. FIG. 12 shows the different networks associated with each individual when the connections include second, third and fourth order friendships, as illustrated by the concentric circles enclosing second, third and fourth order connections. (56, 57, 58) respectively.

This job application can include an incentive payment (cash, gift or gift certificate etc) paid to entities that helped link the employer to the jobseeker. When the facilitator entity notifies the system of the successful linking to claim their payment, the system is indirectly being notified that the employer should be invoiced for having found a successful candidate via the system. This invoicing double check helps detects employers tempted to avoid indicating the recruitment service was responsible for finding an employee. This incentive can appear to the receiver to be initiated by either the system or optionally by the user who received the successful outcome (in this case, the job seeker or employer).

Another method to identify if an employer has hired a jobseeker via the recruitment service is to send an enquiry email to the new company address using the typical email format given of company employees, e.g. firstname.lastname@companyname.com and see whether the email is returned as an invalid address—if the email is successfully delivered and read (if tracking options permit) the individual is likely to be working for the employer and thus needs to pay for the recruitment service.

Aspects of the present invention have been described by way of example only and it should be appreciated that modifications and additions may be made thereto without departing from the scope thereof.

The invention claimed is:

1. A method performed within a social network system accessible over a data network with a plurality of data input devices connectable to said data network, said social network system including a plurality of entity data records each relating to a corresponding user entity and containing one or more entity attributes including at least one identifying characteristic of said corresponding user entity, said method including providing, via said data network, a given user entity with:
    a virtual, unique, personal, social network (hereinafter 'social network') by:
        forming connections between contacts comprising other user entities connected directly or indirectly to the given user entity;
        identifying each of the other user entities by a characteristic representing a node, wherein an identifying characteristic includes a name and contact information for the entity; and
        providing a visual display of interconnections between nodes;
    respective interrelationship context information including:
        details of any common entity attributes, between two contacts and/or between a contact and the given user entity;
        access to at least part of at least one of the entity data records;
        the option to take a role in a predetermined activity and/or application via said data network, wherein said role includes at least one of provider or participant, wherein a provider is a user entity providing an item or service to at least one other user entity; and
        a participant is a user entity utilising said provider's item or service.

2. The method as claimed in claim 1, wherein said application includes at least one of:
consumer decisions, buying, selling, trading loaning; finding flatmates/roommates, tenants;
organising activities and events, recommendations/opinions including those related to films, plays, books, employment, services, tradesmen, accommodation, restaurants, comparison and explorations of common interests;
sharing peer-to-peer personal or business creative work or content, including photos, art-work, literature, music;
managing a club or society;
locating/supplying/"blacklisting" providers of goods or services;
business or technological advice unsuitable for publication;
recruitment, job-seeking;
estate agents;
venture capital;
collaborative ventures;
referrals;
police/security information gathering/informants;
event manager;
address book manager;
search engines;
headhunting;
book mark service;
spam filtering;
car sharing;
sales leads;
market entry advice;
real-estate;
sharing files;
company knowledge management;
medical advice;
travel organiser,
lending/borrowing;
house-sitting;
baby-sitting;
classified advertisements;
finding musicians.

3. The method as claimed in claim 1, wherein said predetermined activity includes instigating, continuing, terminating or responding to an application, search, and/or communication.

4. The method as claimed in claim 1, wherein said entity attributes include at least one identifying characteristic, information regarding personal details, contacts; contact details, factors or interests; friends; relations; school alumni;
employment factors; business colleagues; professional acquaintances; sexual preferences, persuasions, or proclivities; sporting interests; entertainment, artistic, creative or leisure interests; travel interests, commercial, religious, political, theological or ideological belief or opinions; academic, scientific, or engineering disciplines; humanitarian, social, security/military or economic fields and any combination of same.

5. The method as claimed in claim 1, wherein said user entities include an individual, family, personal or organised network, organisation, club, society, company, partnership, religion, or other entity that exists as a particular and discrete unit.

6. A method as claimed in claim 1, wherein said step of forming said social network includes:
communicating an invitation from a first said user entity to one or more other user entities selected by said first user entity for inclusion in the first user entity's social network as a contact;
designating each user entity accepting said invitation as being a direct contact directly connected to the first user entity by a first degree of separation;
wherein for: any second user entity directly connected to the first user entity and any third user entity directly connected to the second user entity but not directly connected to the first user entity, the first and third user entities are indirect contacts, indirectly connected to each other with a second degree of separation;
repeating the above steps for a given user entity having a corresponding entity data record, wherein said given user entity is equivalent to said first user entity in said repeated steps to create, for each said given user entity, a corresponding social network, thereby collectively forming a plurality of social networks on said social network system, inter-connected by mutually connected contacts.

7. The method as claimed in claim 1, further including providing a given user entity with at least partial control of privacy of their social network with respect to a user entity seeking access to the given user entity's data record by permitting the given user entity to specify: which seeking user entities are allowed or denied access to the given user's data record; and/or which entity attributes in the given user entity's data record are accessible or inaccessible to said seeking user entity.

8. The method as claimed in claim 7, wherein said seeking user entities allowed or denied access to the given user's data records are determined by; a connection factor between the given user entity and said seeking user entity; and/or one or more entity attributes of said seeking user entity.

9. The method as claimed in claim 7, wherein said access is available only to seeking user entities meeting defined eligibility criteria, wherein said criteria includes at least one of: an entity attribute, identifying characteristic, supplementary attribute, subscription and/or payment.

10. The method as claimed in claim 9, wherein said eligibility criteria is defined by the given user entity.

11. The method as claimed in claim 7, including providing said seeking user entity with searchable access to at least one of said entity data records.

12. The method as claimed in claim 7, wherein said seeking user entities allowed or denied access to the given user entity's data record are determined according to the predetermined activity and/or application.

13. The method as claimed in claim 1, further including allowing a given user entity to at least partially define at least one of; the given user entity's participation and degree of interaction in said predetermined activity and/or application; and/or the given user entity's visibility and/or accessibility to contacts or other user entities with respect to said predetermined activity and/or application.

14. The method as claimed in claim 1, further including allowing a given user entity to at least partially define at least one of; a contact's participation and degree of interaction in said predetermined activity and/or application; and/or a contact's visibility and/or accessibility to other contacts or user entities with respect to said predetermined activity and/or application.

15. The method as claimed in claim 1, wherein said user entity's role in said predetermined activity and/or application is assigned by the user entity, the social network system, another user entity, and/or an entity external to said social network system.

16. The method as claimed in claim 1, including allowing a user entity to specify whether or not data generated by said predetermined activity and/or application is stored in said social network system after completion of said predetermined activity and/or application.

17. The method as claimed in claim 1, wherein said predetermined activity and/or application is implemented by an entity or organised network external to said social network system.

18. The method as claimed in claim 1, including permitting a given user entity to participate in said predetermined activity and/or application with networks external to the social network system.

19. The method as claimed in claim 1, wherein said predetermined activity and/or application incorporates at least one of: Mobile-Notification Services allowing a given user entity to optionally select whether they receive alerts from said social network system, said alerts provided in the form of a Short-Message (SMS), Enhanced SMS (EMS), Multi-Media Message (MMS), plain email, a paging message, or other message format sent to a mobile communication device; Data-Application Services enabling user entities to optionally and selectively initiate or receive data communications related to their social network via SMS, EMS, MMS, email, WAP, paging, or other wireless application communication data format; Location-Based Services to provide a given user entity with location data using position location systems including one or more of: mobile-phone cell-site location, GPS location, manual or menu-driven location selection, and/or any combination of same, wherein information generated by said predetermined activity and/or application for is at least partially derived from and/or designated by said location data.

20. The method as claimed in claim 1, including recording the given user entity's recommendations regarding said item and/or service.

21. The method as claimed in claim 20, further including providing an item, service and/or financial reward to said recommending user entity according to a predetermined number of hyperlink accesses attributed to the recommending user entity.

22. The method as claimed in claim 1, further including providing a hyperlink to a given user entity of said predetermined activity and/or application, said hyperlink connection being to a website of the item and/or service provider.

23. The method as claimed in claim 1, wherein said item or service is selectively made available by said provider to other user entities with predetermined entity attributes.

24. The method as claimed in claim 1, wherein the roles in said predetermined activity and/or application further include the role of a facilitator, being an entity providing a link or facilitating interaction between a said provider and a said participant.

25. The method as claimed in claim 24, wherein said facilitator is rewarded for aiding in linking a provider with a participant.

26. The method as claimed in claim 1, wherein the given user entity is rewarded according to their success in fulfilling a said role in the predetermined activity and/or application.

* * * * *